United States Patent
Gillett

(10) Patent No.: US 9,518,611 B2
(45) Date of Patent: Dec. 13, 2016

(54) DRIVESHAFT ASSEMBLY

(71) Applicant: FORD GLOBAL TECHNOLOGIES, LLC, Dearborn, MI (US)

(72) Inventor: Matt Gillett, London (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/806,725

(22) Filed: Jul. 23, 2015

(65) Prior Publication Data
US 2016/0032983 A1 Feb. 4, 2016

(30) Foreign Application Priority Data

Aug. 1, 2014 (GB) .................................. 1413694.9
Feb. 20, 2015 (GB) .................................. 1502885.5

(51) Int. Cl.
*F16D 3/02* (2006.01)
*F16D 3/12* (2006.01)
*F16C 3/02* (2006.01)
*F16D 3/10* (2006.01)
*F16D 3/50* (2006.01)

(52) U.S. Cl.
CPC ................. *F16D 3/12* (2013.01); *F16C 3/023* (2013.01); *F16D 3/10* (2013.01); *F16D 3/50* (2013.01)

(58) Field of Classification Search
CPC .............. F16D 3/10; F16D 3/12; F16D 3/023; F16D 3/50
USPC .................................................. 464/97, 160
See application file for complete search history.

(56) References Cited

U.S. PATENT DOCUMENTS

| | | | |
|---|---|---|---|
| 3,408,830 A * | 11/1968 | Sutaruk | B60K 17/22 464/160 |
| 4,877,375 A | 10/1989 | Desjardins | |
| 5,697,847 A * | 12/1997 | Meyer | F16D 3/80 464/160 |
| 5,702,306 A | 12/1997 | Adamek et al. | |
| 5,788,576 A | 8/1998 | Varin | |
| 6,280,339 B1 * | 8/2001 | Yaegashi | F16C 3/03 |
| 9,416,815 B2 * | 8/2016 | Grimmer | F16C 1/02 464/97 |
| 2009/0197690 A1 | 8/2009 | Lyscio | |
| 2011/0209961 A1 * | 9/2011 | Yamamoto | F16D 1/101 |
| 2013/0079160 A1 | 3/2013 | Brosowske | |

(Continued)

FOREIGN PATENT DOCUMENTS

GB 2070194 B 9/1981

*Primary Examiner* — Gregory Binda
(74) *Attorney, Agent, or Firm* — James Dottavio; MacMillan, Sobanski & Todd, LLC

(57) ABSTRACT

A drive shaft assembly is formed from two concentrically arranged driveshafts fastened together near to one end of the driveshaft assembly so as to prevent relative rotation therebetween and connectable together near to an opposite end via a torque sensitive drivable connection. The torsional stiffness of the driveshaft assembly is primarily dependent upon whether one or both driveshafts are arranged to transmit torque. The drivable connection may be a mechanical lost motion connection which is operable to either connect the two driveshafts together or not based upon the magnitude of torque applied to the driveshaft assembly. Therefore, the driveshaft assembly provides more than one torsional stiffness allowing it to be better optimized to meet differing operational requirements.

11 Claims, 16 Drawing Sheets

(56) References Cited

U.S. PATENT DOCUMENTS

2016/0146245 A1\* 5/2016 Thomas .................. F16C 3/023
464/97

\* cited by examiner

| Gear | Individual gear ratio | Combined gear ratio |
|---|---|---|
| 1st | 3.727 | 15.158 |
| 2nd | 2.048 | 8.327 |
| 3rd | 1.357 | 5.519 |
| 4th | 1.032 | 4.198 |
| 5th | 0.821 | 3.337 |
| 6th | 0.690 | 2.808 |
| Rev | 3.818 | 15.527 |
| FDR | 4.067 | |

Fig. 8B

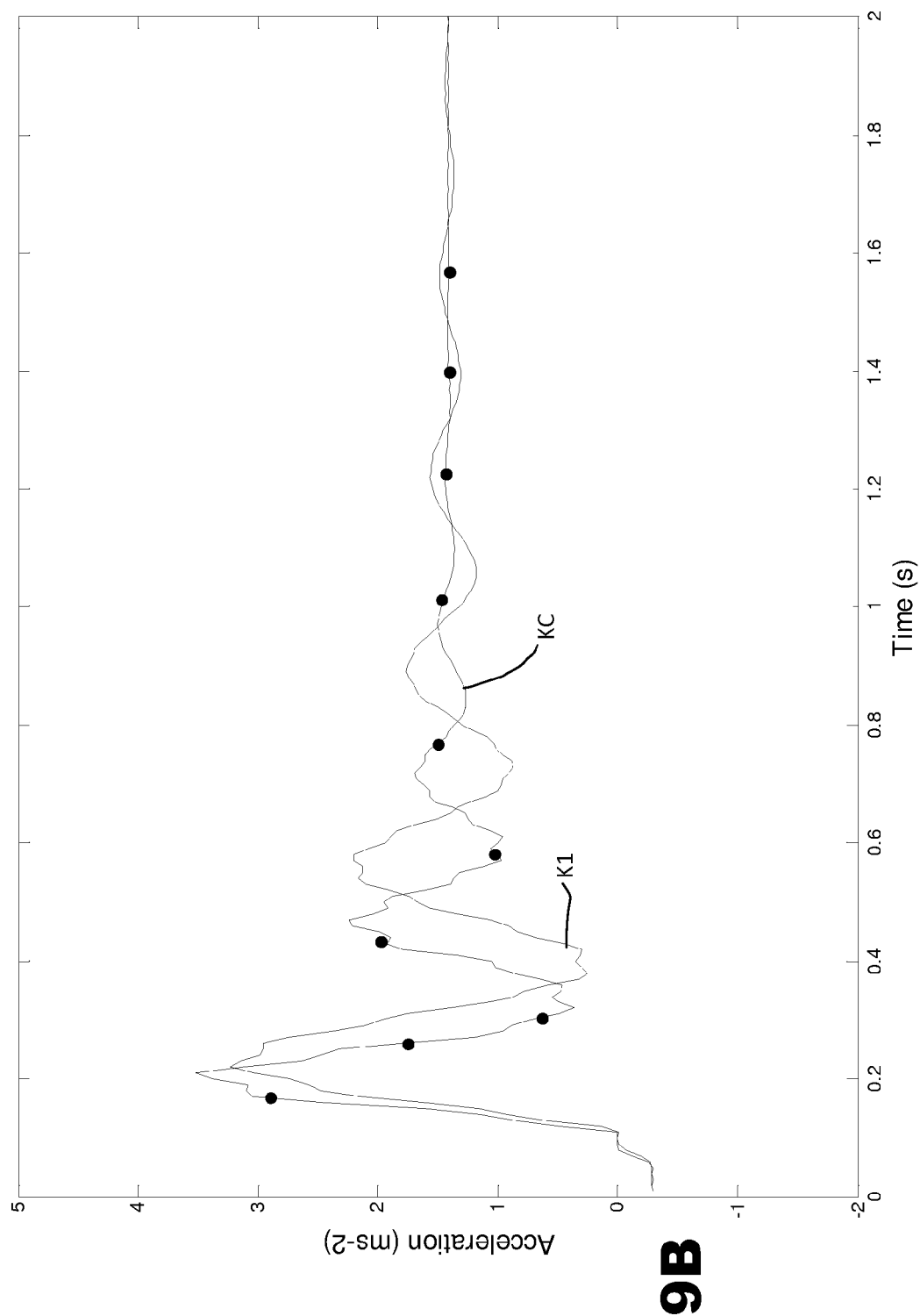

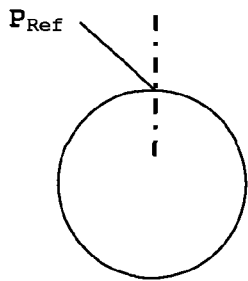
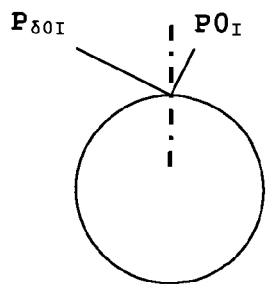
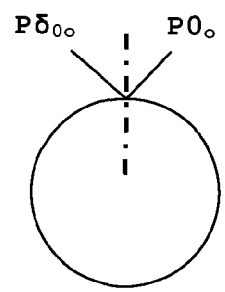
Fig. 10A  Fig. 10B  Fig. 10C
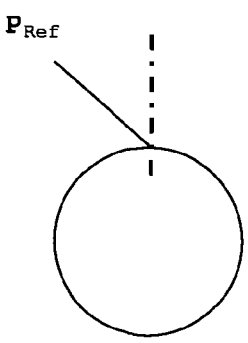
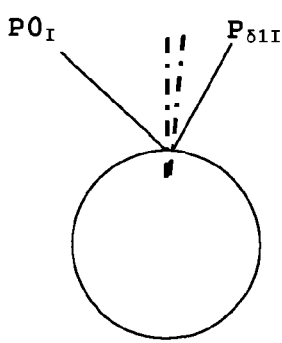
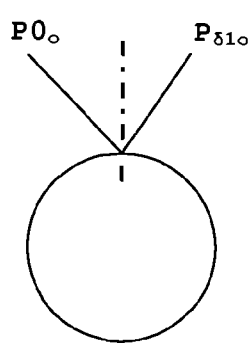
Fig. 11A  Fig. 11B  Fig. 11C
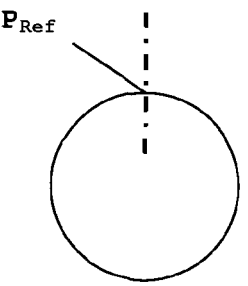
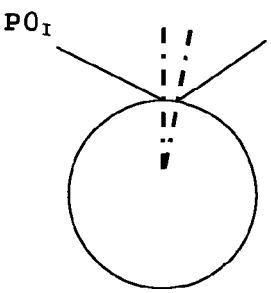
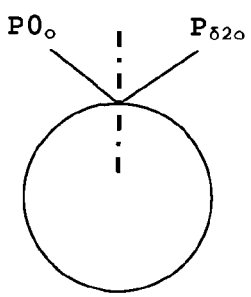
Fig. 12A  Fig. 12B  Fig. 12C
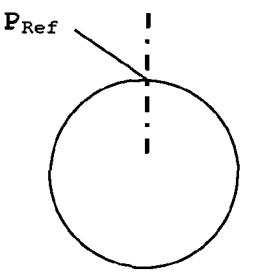
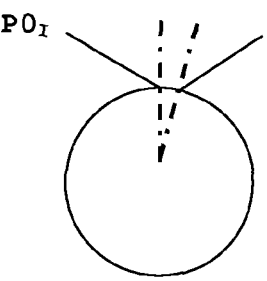
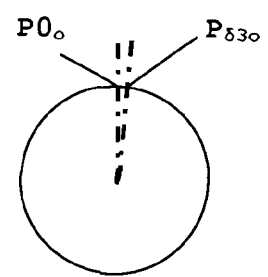
Fig. 13A  Fig. 13B  Fig. 13C

Fig. 14A  Fig. 14B  Fig. 14C

DRIVESHAFT ASSEMBLY

CROSS REFERENCE TO RELATED APPLICATIONS

This application claims priority to application GB 1413694.9, filed in the United Kingdom Intellectual Property Office on Aug. 1, 2014, and to application GB 1502885.5, filed in the United Kingdom Intellectual Property Office on Feb. 20, 2015, which are hereby incorporated by reference in their entirety.

STATEMENT REGARDING FEDERALLY SPONSORED RESEARCH

Not Applicable.

BACKGROUND OF THE INVENTION

This invention relates to driveshafts for providing a drivable rotary connection between two components and, in particular, to a driveshaft assembly for use as a motor vehicle half-shaft drivably connecting a driven road wheel of a motor road vehicle to a source of motive power.

The increased use of engines having a lower number of cylinders such as, for example two and three cylinder engines has increased the significance of firing frequency torsional vibrations to passenger comfort. This is especially the case when damping technologies such as dual mass flywheels and/or balancing shafts are excluded for cost reasons.

Low stiffness for the driveshafts is required to isolate vehicle occupants from the torsional engine vibrations under low RPM, high torque driving referred to as 'lugging'. During low RPM, high load driving, engine main order firing frequency vibrations at 40-50 Hz are transmitted through transmission mounts to vehicle occupants via the excitation of cavity modes in large panels and as vibration though driver controls and seats.

Reducing driveshaft stiffness reduces the motion of lugging vibration at the compliances, primarily engine and chassis mounts thereby reducing the amplitude of vibration transmitted to the cabin, improving passenger comfort.

Driveshafts with high stiffness are beneficial for reducing low frequency (2 to 8 Hz) longitudinal vehicle acceleration noise or 'shuffle'. This fore-to-aft oscillatory motion can be uncomfortable and cause motion sickness for occupants. Shuffle is created by torsional winding and unwinding of the less stiff driveline components under the forces exerted on them by the vehicle mass and torque source during transient maneuvers.

Increased driveshaft stiffness both improves the damping ratio by increasing the motion at compliances, primarily tires, and increases the vehicle natural shuffle frequency. This reduces both time for the amplitude of oscillation to drop below a perceivable threshold and passenger exposure to less comfortable low frequencies. Increased shuffle frequency and system damping also enables calibratable drivability methods to be employed less aggressively, improving the connectivity and immediacy of the vehicle response to the driver's acceleration request.

Therefore conflicting requirements exist for a driveshaft in that it is not possible to optimally absorb high frequency (40-50 Hz) and transmit low frequency (2-8 Hz) motion with a driveshaft having a single torsional stiffness.

SUMMARY OF THE INVENTION

It is an object of the invention to provide a simple and cost effective driveshaft assembly that reduces the compromises required with the use of a single stiffness driveshaft by optimizing the ability of drivetrain system to absorb undesirable vibration in distinct frequency ranges.

According to the invention there is provided a driveshaft assembly comprising at least two coaxially arranged driveshafts connected together near to a first end of the driveshaft assembly so as to prevent relative rotation therebetween and connectable together near a second end of the driveshaft assembly by a drivable connection operable to provide at least two different torsional stiffness values for the driveshaft assembly based upon the magnitude of driving torque applied to the driveshaft assembly. The drivable connection at a second end of the assembly permits a limited relative rotation of the driveshafts. Thus, the torsional stiffness of the driveshaft assembly is dependent upon the torsional stiffness of the individual driveshafts and the number of driveshafts used to transfer torque through the driveshaft assembly.

There may be two coaxially arranged driveshafts drivably connected together near to the first end of the driveshaft assembly and connectable together near to a second end of the driveshaft assembly by the drivable connection and the drivable connection is operable in a first mode of operation to provide a torsional stiffness for the driveshaft assembly equal to a first value of torsional stiffness and in a second mode of operation is operable to provide a torsional stiffness for the driveshaft assembly equal to a second value of torsional stiffness wherein the second value of torsional stiffness is greater than the first value of torsional stiffness.

In the first mode of operation, drive force may be transmitted by the driveshaft assembly via only one of the driveshafts and, in the second mode of operation (i.e., after a limited angular deflection of one driveshaft), drive force may be transmitted by the driveshaft assembly via both of the driveshafts.

The two driveshafts may comprise a first driveshaft and a second driveshaft arranged one within the other and, in the first mode of operation, the torsional stiffness of the driveshaft assembly may be equal to the torsional stiffness of one of the first and second driveshafts and in the second mode of operation the torsional stiffness of the driveshaft assembly may be equal to the sum of the stiffness of the first driveshaft and the stiffness of the second driveshaft.

The first mode of operation may be a mode of operation in which the magnitude of positive driving torque applied to the driveshaft assembly is below a predetermined torque limit and the second mode of operation may be a mode of operation in which the magnitude of positive driving torque applied to the driveshaft assembly is above the predetermined torque limit.

A positive torque preload may be applied to the two driveshafts and the drivable connection may be operable in three modes of operation based upon the magnitude of positive driving torque applied to the driveshaft assembly, the first mode of operation being used when a magnitude of positive driving torque applied to the driveshaft assembly is below a predetermined torque limit but above the value of preload torque, the second mode of operation is a mode of operation used when the magnitude of positive driving torque applied to the driveshaft assembly is above the predetermined torque limit, and the third mode of operation is a mode of operation used when the magnitude of positive driving torque applied to the driveshaft assembly is greater than zero but less than the value of preload torque. In the first and third modes of operation, drive force may be transmitted by the driveshaft assembly via only one of the driveshafts and in the second mode of operation, drive is transmitted by the driveshaft assembly via both of the driveshafts. The two driveshafts may comprise a first driveshaft and a second driveshaft arranged one within the other and, in the first mode of operation, the torsional stiffness of the driveshaft assembly may be equal to the torsional stiffness of one of the first and second driveshafts and in the second and third modes of operation the torsional stiffness of the driveshaft assembly may be equal to the sum of the stiffness of the first driveshaft and the stiffness of the second driveshaft.

There may be two driveshafts, the drivable connection may comprise a mechanical lost motion connection between the two driveshafts and the mechanical lost motion connection may permit limited angular deflection of one of the driveshafts to occur due to an applied torque to the driveshaft assembly without causing angular deflection of the other driveshaft.

The mechanical lost motion connection may comprise a pair of end stops drivingly connected to one of the two driveshafts and a drive member drivingly connected to the other of the two driveshafts so as to be positioned with clearance between the two end stops. The two end stops may be formed by circumferentially spaced apart edges of one of a recess and a slot formed in the one of the two driveshafts. Alternatively, the two end stops may be formed by circumferentially spaced apart longitudinal edges of a C-shaped ring fastened to the one of the two drive shafts.

The drive member may be drivingly connected to the other of the two driveshafts by being fastened thereto. The drive member may be drivingly connected to the other of the two driveshafts by engagement with one of a slot, an aperture and a recess in the other driveshaft.

One of the two driveshafts may be a tubular driveshaft and the other driveshaft may be fitted with clearance within the one driveshaft.

The driveshaft assembly may be a motor vehicle halfshaft drivably connecting a transmission of the motor vehicle to a road wheel of the motor vehicle.

According to a second aspect of the invention there is provided a motor road vehicle having a source of motive power driving a transmission including a final drive wherein the final drive of the transmission is connected to at least one driven road wheel of the motor vehicle by a driveshaft assembly constructed in accordance with said first aspect of the invention.

The motor vehicle may have two driven road wheels and both of the driven road wheels may be connected to the final drive of the transmission by a respective driveshaft assembly constructed in accordance with said first aspect of the invention.

Alternatively, all driven road wheels of the motor vehicle are connected to the transmission by a respective driveshaft assembly constructed in accordance with said first aspect of the invention.

BRIEF DESCRIPTION OF THE DRAWINGS

FIG. 8B is a table showing the gear ratios used to produce the angular displacements shown on the chart of FIG. 8A.

FIG. 9B is a chart showing a comparison of the predicted relationship in second gear between vehicle longitudinal acceleration and time when a 100 Nm step engine torque is applied to a single 6000 Nm/rad driveshaft and a driveshaft assembly constructed in accordance with the second embodiment of the first aspect of the invention.

FIG. 10A is a schematic end view of the driveshaft assembly according to the first embodiment as viewed from the second end of the driveshaft assembly showing the location of a reference point $P_{Ref}$ on the first end of the driveshaft assembly when no torque is being applied to the driveshaft assembly corresponding to the situation shown in FIG. 3A.

FIG. 10B is a schematic end view of the driveshaft assembly according to the first embodiment as viewed from the second end of the driveshaft assembly showing the location of a zero torque reference point $P0_I$ on the inner driveshaft at the second end of the driveshaft assembly and the position $P_{\delta 0I}$ that the reference point on the inner driveshaft has adopted when no torque is being applied to the driveshaft assembly this position corresponds to the situation shown in FIG. 3A.

FIG. 10C is a schematic end view of the driveshaft assembly according to the first embodiment as viewed from the second end of the driveshaft assembly showing the location of a zero torque reference point $P0_o$ on the outer driveshaft at the second end of the driveshaft assembly and the position $P_{\delta 0o}$ that the reference point on the outer driveshaft has adopted when no torque is being applied to the driveshaft assembly and corresponds to the situation shown in FIG. 3A.

FIG. 11A is a schematic end view of the driveshaft assembly according to the first embodiment as viewed from the second end of the driveshaft assembly showing the location of a reference point $P_{Ref}$ on the first end of the driveshaft assembly when a positive torque is being applied to the driveshaft assembly that is greater than zero but less than a predefined torque limit corresponding to the situation shown in FIG. 3B.

FIG. 11B is a schematic end view of the driveshaft assembly according to the first embodiment as viewed from the second end of the driveshaft assembly showing the location of the zero torque reference point $P0_I$ on the inner driveshaft at the second end of the driveshaft assembly and the position $P_{\delta 1I}$ of the reference point on the inner driveshaft when a positive torque is being applied to the driveshaft assembly that is greater than zero but less than a predefined torque limit and corresponds the situation shown in FIG. 3B.

FIG. 11C is a schematic end view of the driveshaft assembly according to the first embodiment as viewed from the second end of the driveshaft assembly showing the location of the zero torque reference point $P0_o$ on the outer driveshaft at the second end of the driveshaft assembly and the position $P_{\delta 1o}$ of the reference point on the outer driveshaft when a positive torque is being applied to the driveshaft assembly that is greater than zero but less than a predefined torque limit and corresponds to the situation shown in FIG. 3B.

FIG. 12A is a schematic end view of the driveshaft assembly according to the first embodiment as viewed from the second end of the driveshaft assembly showing the location of a reference point $P_{Ref}$ on the first end of the driveshaft assembly when a positive torque is being applied to the driveshaft assembly that is equal to the predefined torque limit and corresponds to the situation shown in FIG. 3C.

FIG. 12B is a schematic end view of the driveshaft assembly according to the first embodiment as viewed from the second end of the driveshaft assembly showing the location of the zero torque reference point $P0_I$ on the inner driveshaft at the second end of the driveshaft assembly and the position $P_{\delta 2I}$ of the reference point on the inner driveshaft when a positive torque is being applied to the driveshaft assembly that is equal to the predefined torque limit and corresponds to the situation shown in FIG. 3C.

FIG. 12C is a schematic end view of the driveshaft assembly according to the first embodiment as viewed from the second end of the driveshaft assembly showing the location of the zero torque reference point $P0_o$ on the outer driveshaft at the second end of the driveshaft assembly and the position $P_{\delta 2o}$ of the reference point on the outer driveshaft when a positive torque is being applied to the driveshaft assembly that is equal to the predefined torque limit and corresponds to the situation shown in FIG. 3C.

FIG. 13A is a schematic end view of the driveshaft assembly according to the first embodiment as viewed from the second end of the driveshaft assembly showing the location of a reference point $P_{Ref}$ on the first end of the driveshaft assembly when a positive torque is being applied to the driveshaft assembly that is greater than the predefined torque limit corresponding to the situation shown in FIG. 3D.

FIG. 13B is a schematic end view of the driveshaft assembly according to the first embodiment as viewed from the second end of the driveshaft assembly showing the location of the zero torque reference point $P0_I$ on the inner driveshaft at the second end of the driveshaft assembly and the position $P_{\delta 3I}$ of the reference point on the inner driveshaft when a positive torque is being applied to the driveshaft assembly that is greater than the predefined torque limit and corresponds the situation shown in FIG. 3D.

FIG. 13C is a schematic end view of the driveshaft assembly according to the first embodiment as viewed from the second end of the driveshaft assembly showing the location of the zero torque reference point $P0_o$ on the outer driveshaft at the second end of the driveshaft assembly and the position $P\delta 3_o$ of the reference point on the outer driveshaft when a positive torque is being applied to the driveshaft assembly that is greater than the predefined torque limit and corresponds to the situation shown in FIG. 3D.

FIG. 14A is a schematic end view of the driveshaft assembly according to the first embodiment as viewed from the second end of the driveshaft assembly showing the location of a reference point $P_{Ref}$ on the first end of the driveshaft assembly when a negative torque is being applied to the driveshaft assembly corresponding approximately to the situation shown in FIG. 4.

FIG. 14B is a schematic end view of the driveshaft assembly according to the first embodiment as viewed from the second end of the driveshaft assembly showing the location of the zero torque reference point $P0_I$ on the inner driveshaft at the second end of the driveshaft assembly and the position $P_{-\delta 1I}$ of the reference point on the inner driveshaft when a negative torque is being applied to the driveshaft assembly and corresponds approximately to the situation shown in FIG. 4.

FIG. 14C is a schematic end view of the driveshaft assembly according to the first embodiment as viewed from the second end of the driveshaft assembly showing the location of the zero torque reference point $P0_o$ on the outer driveshaft at the second end of the driveshaft assembly and the position $P_{-\delta 1o}$ of the reference point on the outer driveshaft when a negative torque is being applied to the driveshaft assembly and corresponds approximately to the situation shown in FIG. 4.

DETAILED DESCRIPTION OF PREFERRED EMBODIMENTS

Figure 1:
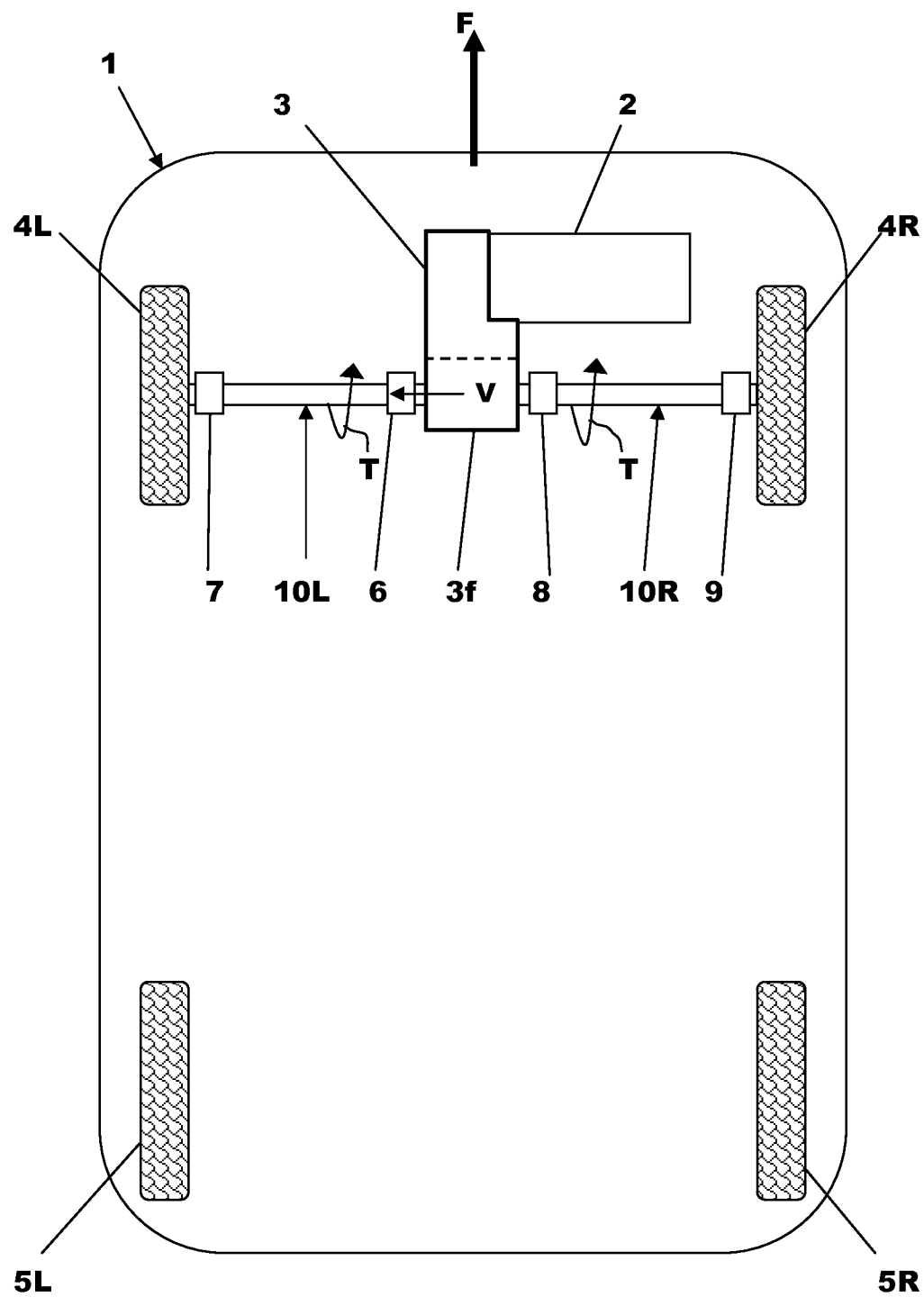
FIG. 1 is a schematic plan view of a motor vehicle according to a second aspect of the invention having a driveline including a pair of driveshaft assemblies constructed in accordance with a first aspect of the invention.

With particular reference to FIG. 1, a road motor vehicle 1 has a source of motive power in the form of an engine 2 driving a transmission 3. The motor vehicle 1 has in this case four road wheels 4L, 4R; 5L, 5R of which the front pair of wheels 4L and 4R are driven road wheels and the rear pair of road wheels 5L and 5R are un-driven road wheels. The motor vehicle 1 is therefore in this case a front wheel drive motor vehicle. It will however be appreciated that the invention could alternatively be applied to a rear wheel drive motor vehicle or to an all wheel drive motor vehicle.

A final drive 3f of the transmission 3 is arranged to drive the two front wheels 4L, 4R via a pair of driveshaft assemblies constructed in accordance with this invention in the form of left and right halfshafts 10L and 10R respectively. It will be appreciated that the final drive 3f may include a differential as is well known in the art.

The left side halfshaft 10L is connected to the final drive 3f via an inboard left hand side constant velocity joint 6 and to the left front road wheel 4L via an outboard left hand side constant velocity joint 7.

The right side halfshaft 10R is connected to the final drive 3f via an inboard right hand side constant velocity joint 8 and to the right front road wheel 4R via an outboard right hand side constant velocity joint 9.

The arrows "T" show the direction of applied driving torque required to move the motor vehicle 1 in a forward direction as indicated by the arrow "F" on FIG. 1. The application of a driving torque in the direction "T" is referred to as a positive driving torque.

The application of a driving torque in the opposite direction to the direction "T" will cause reverse motion of the motor vehicle 1 and is therefore is referred to herein as a reverse or negative driving torque "R".

With particular reference to FIGS. 2 to 5, the left hand halfshaft 10L comprises an inner driveshaft 11 and an outer tubular driveshaft 12 arranged concentrically and coaxially so as to form a driveshaft assembly in the form of the left hand side halfshaft 10L.

The inner driveshaft 11 has a torsional stiffness K1 Nm/rad and the outer driveshaft 12 has a torsional stiffness K2 Nm/rad and in this example K2 is equal to K1.

At a first end of the halfshaft 10L, the inner and outer driveshafts 11 and 12 are connected together so as to provide a driving connection therebetween. The connection at the first end of the halfshaft 10L prevents relative rotation or relative angular displacement between the inner and outer driveshafts 11 and 12. In the case of this example, an annular plate 16 is welded around an inner perimeter (as indicated by the reference numeral 17) to the inner driveshaft 11 and is welded around an outer perimeter (as indicated by the reference numeral 18) to the outer driveshaft 12. It will be appreciated that other methods of connecting the two driveshafts 11, 12 together could be used and that the invention is not limited to welding.

Near to a second, distal end of the halfshaft 10L, the two driveshafts 11, 12 are connectable together by a drivable connection. The drivable connection provides limited relative rotation between the two driveshafts 11, 12 at the second end of the halfshaft 10L at least when torque is applied in a positive direction as indicated by the arrow "T" within a predefined defined torque range (0 to $T_{lim}$).

The drivable connection comprises in this example a short C-shaped ring 13 fastened in a bore of the outer driveshaft 12 and a drive member 14 connected to the inner driveshaft 11. In the example shown in FIG. 2, elastomeric or rubber bump stops 15 are located in a recess formed in the C-shaped ring 13 but in the example shown in FIGS. 3a to 3c and 4 the bump stops 15 have been omitted and the C-shaped ring 13 has a solid wall.

First and second end stops 21, 22 are formed by circumferentially spaced apart longitudinal edges of the C-shaped ring 13 for selective cooperation with the drive member 14 that is connected to the inner driveshaft 11 for rotation therewith. The drive member 14 can be of many forms including, but not limited to, a lug or projection fastened to the inner driveshaft by welding or brazing, a lug engaged with an aperture or recess in the inner driveshaft 11 or a key engaged with a keyway in the inner driveshaft 11. It will also be appreciated that there may be more than one drive member connected to the inner shaft 11 in which case each drive member is arranged for cooperation with a respective pair of end stops.

It will also be appreciated that the reverse arrangement could be used where a pair of end stops is drivingly connected to the inner driveshaft 11 and a drive member is drivingly connected to the outer driveshaft 12.

In addition, it will be appreciated that the two end stops could be formed by circumferentially spaced apart edges of a recess, aperture or slot formed in the respective driveshaft.

A dust shield or dust seal 19 is located on the second end of the halfshaft 10L to prevent the ingress of dust and debris into the space defined between the two driveshafts 11, 12 and in particular between the drive member 14 and the end stops 21, 22. The second end of the halfshaft 10L is in the case of this example connected to the left hand side inboard constant velocity joint 6 as shown on FIG. 1.

Figure 5:
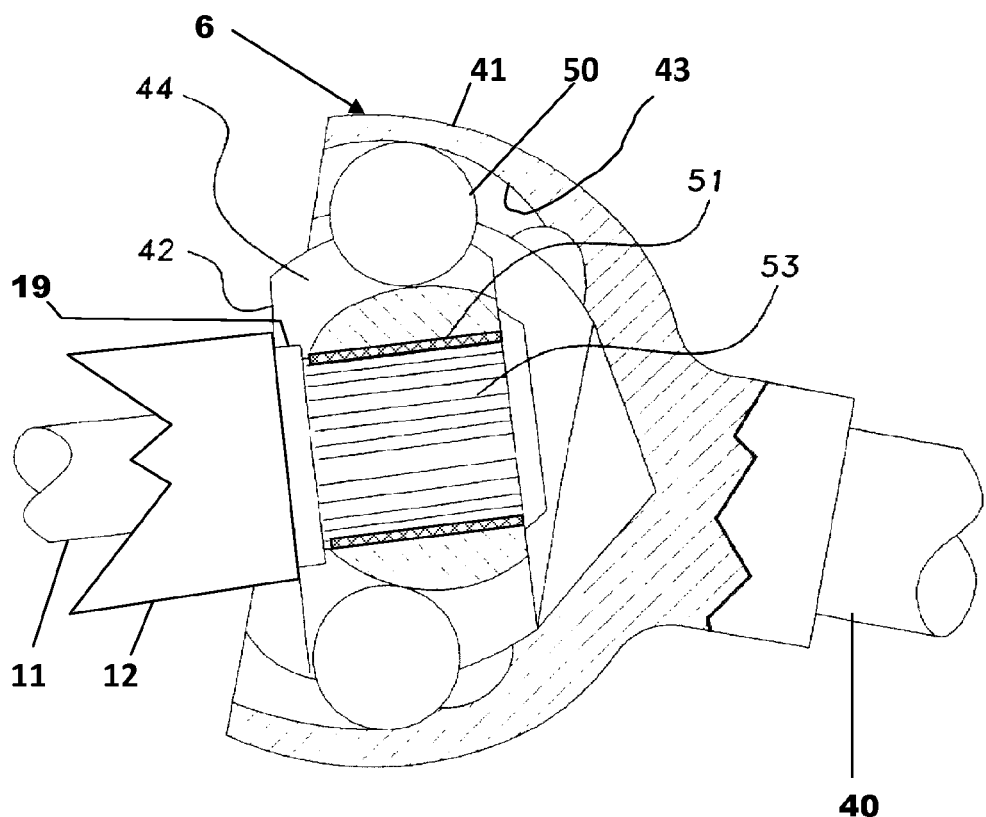
FIG. 5 is a pictorial view showing the connection of one end of a driveshaft assembly constructed in accordance with the first aspect of the invention to a constant velocity joint.

As shown in FIG. 5, the inner driveshaft 11 projects out from the outer driveshaft 12 and has an external spline 53 formed thereon for cooperation with a complementary female spline 51 formed in an inner race 42 of the constant velocity joint 6.

In this embodiment, the inner race 42 has a ball track groove 44 on an outer surface for cooperation with a number of ball bearings 50. A housing 41 has a ball track 43 formed in an inner surface thereof so as to form an outer race for the ball bearings 50.

The housing 41 has an input shaft 40 connected to an output from the final drive 3f of the transmission 3.

Operation of the constant velocity joint 6 is completely conventional and is not described further.

It will be appreciated that the right hand side halfshaft 10R is of the same construction and arrangement as that previously described with respect to the left hand side halfshaft 10L. The second end of the right hand side halfshaft 10R is connected to the right hand side inboard constant velocity joint 8 and the constant velocity joint 8 is constructed in a similar manner to the constant velocity joint 6 shown in FIG. 7.

A similar splined connection as described above is used to connect the two halfshafts 10L, 10R to the outer constant velocity joints 7 and 9.

However, it will be appreciated that the invention is not limited to the use of a constant velocity joint of the type shown nor to a splined connection from each of the halfshafts 10L, 10R to its respective constant velocity joint 6, 7; 8, 9 and that alternative methods of connection between the halfshafts 10L, 10R and the associated constant velocity joints 6, 7; 8, 9 could be used.

Referring now to FIGS. 3a to 3d, as viewed by the cross-section represented by line A-A in FIG. 2, construction and operation of a first embodiment of a driveshaft assembly in the form of the left hand side halfshaft 10L will be described when a positive or forward driving torque "T" is applied to the halfshaft 10L.

Figure 3A:
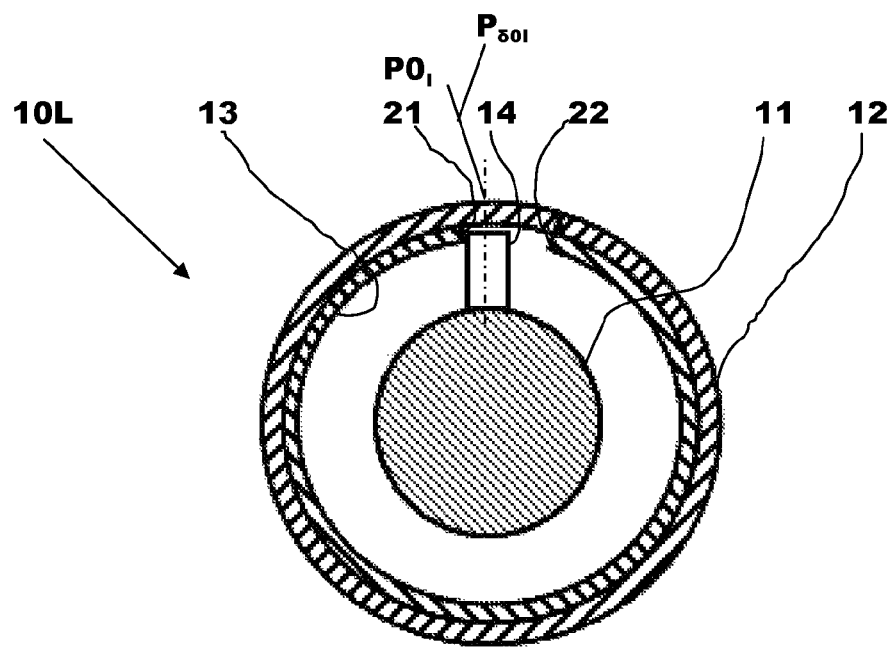
FIGS. 3A, 3B, 3C, and 3D are end views in the direction of arrow V on FIGS. 1 and 2 showing the effect of applying positive or forward driving torques of differing magnitude to the driveshaft assembly shown in FIG. 2 when arranged in accordance with a first embodiment of the first aspect of the invention.

The inner drive shaft 11 is located within the outer driveshaft 12 so that the attached drive member 14 is positioned between the two end stops 21, 22. The two driveshafts 11, 12 are positioned so as to locate the drive member 14 in a desired position between the two end stops 21, 22. In the case of this first embodiment, the desired position for the drive member 14 is such that one face of the drive member 14 rests against the first end stop 21 as shown in FIG. 3a. In this position no torque is being applied to the halfshaft 10L and the angular position of the inner driveshaft 11 at the second end is referenced as $P0_I$ and is aligned with a zero torque reference position $P_{Ref}$ at the first end of the inner driveshaft 11. The annular end plate 16 is welded in place to fasten the inner and outer driveshafts 11 and 12 together at the first end of the halfshaft 10L so as to locate the drive member 14 in this desired position with no torque applied to any of the driveshafts 11, 12.

It will be appreciated that the reference position $P_{Ref}$ for the inner driveshaft 11 never alters at the first end of the inner driveshaft 11 relative to a corresponding reference position or point $P_{Ref}$ of the outer driveshaft 12 at the first end of the driveshaft assembly because it is connected thereto by the welded joint therebetween.

However, it will be appreciated that in use the reference positions $P_{Ref}$ are rotating when the halfshaft 10L rotates and that the other reference points rotate with it.

Therefore any difference in angular position of the inner shaft 11 at the second end relative to its respective reference position $P_{Ref}$ at the first end is related to the torsional stiffness of the inner driveshaft 11 and the torque applied to the second end of the inner driveshaft 11.

The outer driveshaft 12 has an angular position corresponding to the reference position $P_{Ref}$ of the inner driveshaft 11 and, as for the inner driveshaft 11, any difference in angular position of the outer shaft 12 relative to the reference position $P_{Ref}$ at the first end for the outer driveshaft 12 is related to the torsional stiffness of the outer driveshaft 12 and the torque applied to the second end of the outer driveshaft 12.

If zero positive torque is applied to the halfshaft 10L then there will be no angular deflection of the inner driveshaft 11 and so the reference position $P_{\delta 0I}$ remains coincident with the position $P0_I$ as shown in FIG. 3a.

If a mean positive driving torque "T" is applied to the second end of the halfshaft 10L from the position shown in FIG. 3a the torsional stiffness of the halfshaft 10L will be equal to the torsional stiffness (K1) of only the inner driveshaft 11, that is to say, in this case, the resistance to twisting of the halfshaft 10L or torsional stiffness Kc of the halfshaft 10L will be equal to K1 Nm/rad. This is because in this case there is no drive path to the outer driveshaft 12.

Figure 3B:
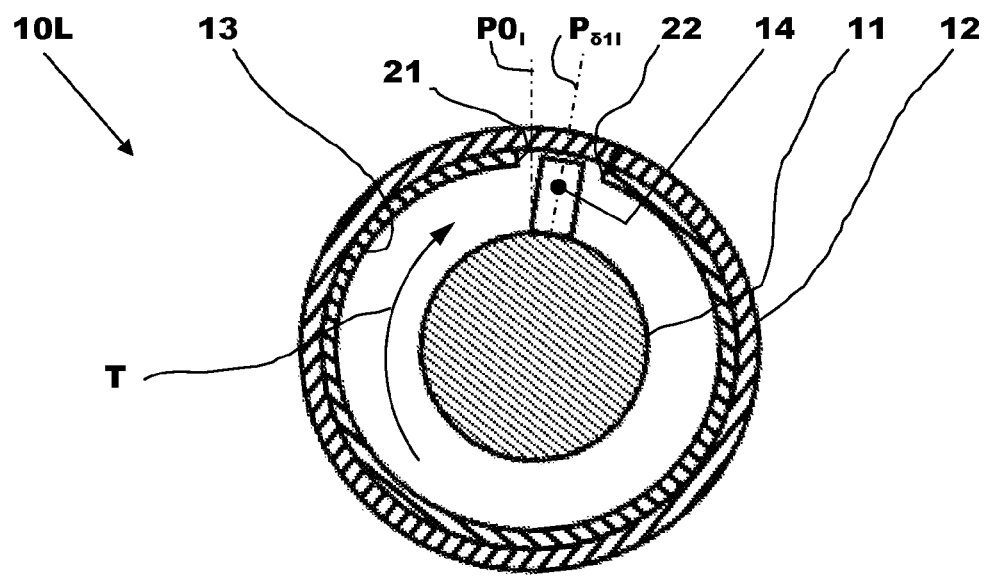

As torque is increased in the positive "T" direction to the halfshaft 10L it will cause the drive member 14 to move away from the first end stop 21 due to wind up of the inner driveshaft 11. FIG. 3b shows the situation where the application of a positive torque δ1 has caused the inner driveshaft 11 to be angularly deflected and the reference point to be angularly displaced to the position $P_{\delta 1I}$ from the position $P0_I$. Note that the positions of the first and second end stops 21 and 22 have not altered because no driving torque is being applied to the outer driveshaft 12.

Figure 3C:
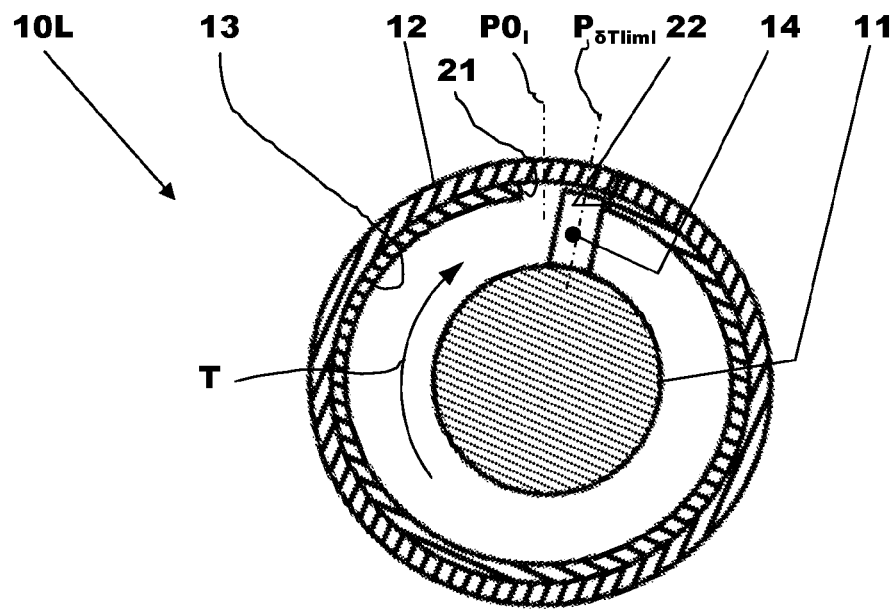

When the mean positive driving torque "T" applied to the halfshaft 10L reaches a predefined torque limit $T_{lim}$ such as, for example but without limitation 500 Nm, the torsional rotation of the inner driveshaft 11 relative to the outer driveshaft 12 will cause the drive member 14 to be angularly displaced with the inner driveshaft 11 (the reference point on the inner shaft 11 moving to the rotational position $P_{\delta TlimI}$). In this angularly deflected state of the inner drive shaft 11, the drive member 14 will come into initial contact with the second end stop 22. In this position, as shown in FIG. 3c, the interaction between the drive member 14 and the second end stop 22 drivingly connects the inner and outer driveshafts 11 and 12 together. This driving connection between the inner and outer driveshafts 11 and 12 will then remain for all positive driving torques applied to the halfshaft 10L greater than the predefined torque limit $T_{lim}$.

Therefore, for positive driving torques of magnitude greater than the predefined torque limit ($T_{lim}$), the torsional stiffness (Kc) of the halfshaft 10L is equal to the combined torsional stiffness (K1) of the inner driveshaft 11 and the torsional stiffness (K2) of the outer driveshaft 12. That is to say, in this case, the resistance to twisting of the halfshaft 10L or torsional stiffness Kc of the halfshaft 10L is equal to K1 Nm/rad plus K2 Nm/rad.

It will be appreciated that the predefined torque limit $T_{lim}$ is reached when the drive member 14 engages with the second end stop 22. Therefore, the predefined torque limit $T_{lim}$ is related to the torsional stiffness K1 of the inner driveshaft 11 and the angular rotation of the inner drive shaft 11 required to rotate the second end of the inner driveshaft 11 from the zero applied torque position $P0_I$, where the drive member 14 rests against the first end stop 21, to the angular position $P_{\delta TlimI}$ where the drive member 14 contacts the second end stop 22 as shown in FIG. 3c.

Figure 3D:
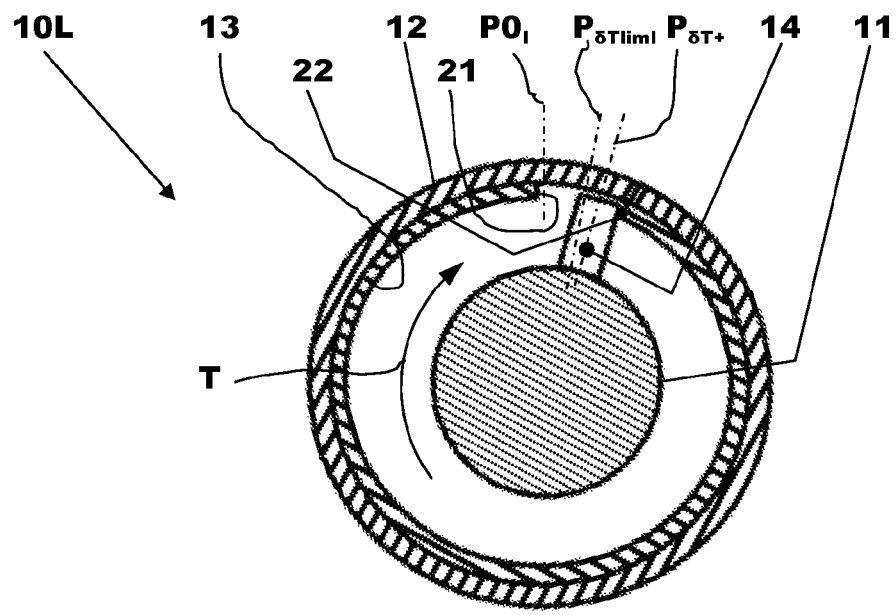

As shown in FIG. 3d, if the mean positive driving torque "T" applied to the halfshaft 10L exceeds the predefined torque limit $T_{lim}$ this will result in torsional twisting of both the inner driveshaft 11 and the outer driveshaft 12. The rotational position of the first and second end stops 21 and 22 will therefore also be angularly displaced in the same direction because they are fastened to the outer driveshaft 12. The rotational position $P_{\delta T+}$ of the inner driveshaft 11 shown on FIG. 3d is the position of the inner driveshaft 11 when an applied torque δT greater than $T_{lim}$ has been applied to the halfshaft 10L.

If the circumferential gap for the same stop radii is reduced or the amount of possible angular displacement of the inner driveshaft 11 is reduced for the same torsional stiffness then the magnitude of torque set for the predefined torque limit $T_{lim}$ will be lower and vice-versa.

In this first embodiment of the invention, the zero torque position $P0_I$ for the second end of the inner driveshaft 11 is set as the position where the drive member 14 first contacts the first end stop 21 but this need not be the case. For example and without limitation, the zero torque position could be set such that there is a gap between the drive member 14 and the first end stop 21.

In a first mode of operation, drive force is transmitted by the halfshaft 10L via only the inner driveshaft 11 and the torsional stiffness of the halfshaft 10L is equal to the torsional stiffness of the inner driveshaft 11.

In a second mode of operation, drive force is transmitted by the halfshaft 10L via both of the driveshafts 11, 12 and the torsional stiffness of the halfshaft 10L is equal to the combined torsional stiffness of both of the driveshafts 11, 12.

These modes are automatically selected based upon the magnitude of the positive driving torque applied to the halfshaft 10L and the value set for the predefined torque limit $T_{lim}$. The halfshaft 10L is therefore controlled based upon applied torque and so is a torque sensing device.

The first mode of operation is automatically used when the magnitude of torque transmitted by the halfshaft 10L is below the predefined torque limit $T_{lim}$ and the second mode of operation is automatically used when the magnitude of torque transmitted by the halfshaft 10L is at or above the predefined torque limit $T_{lim}$.

Figure 2:
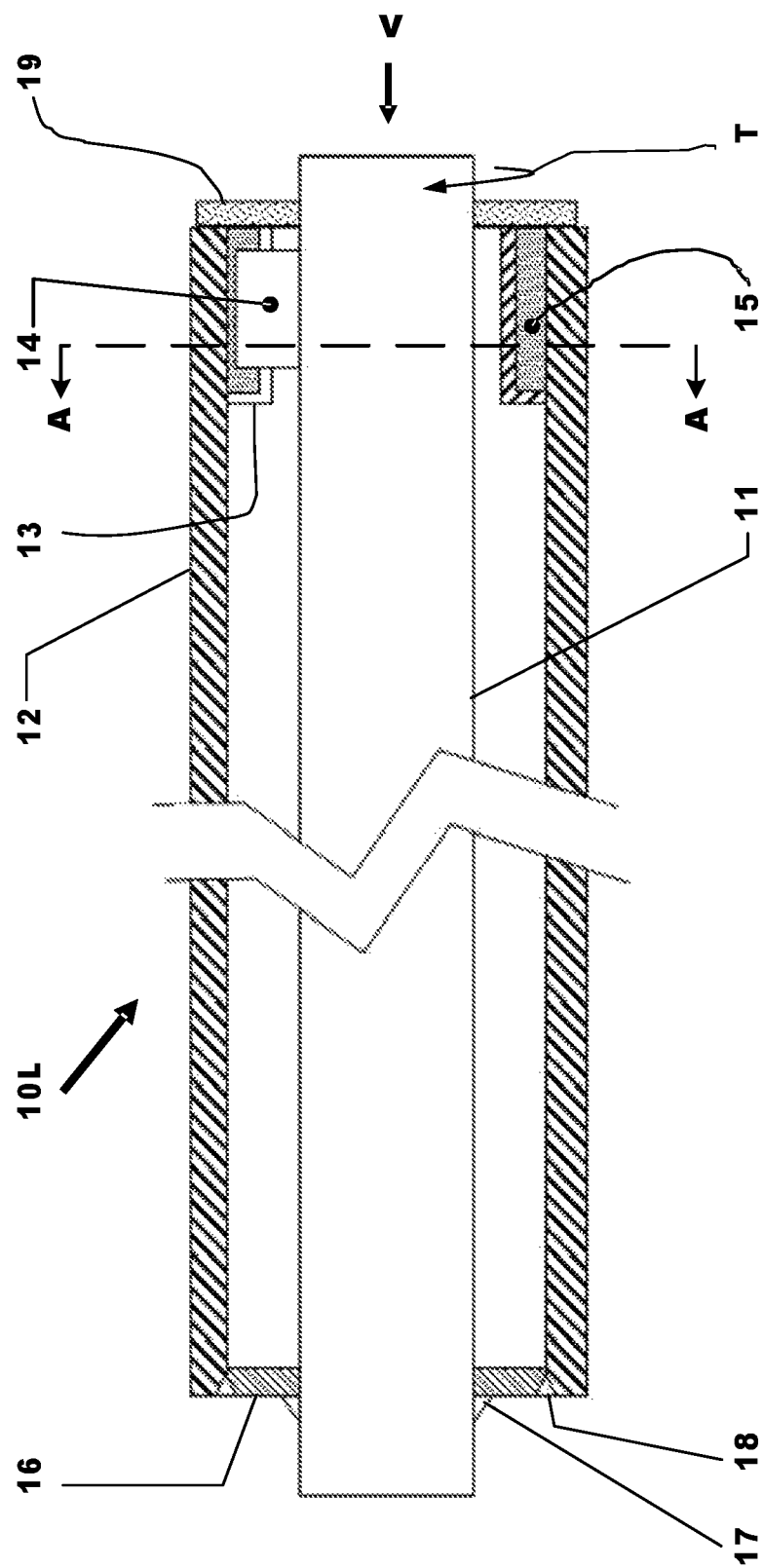
FIG. 2 is a longitudinal cross-section through a driveshaft assembly according to the first aspect of the invention.
Figure 4:
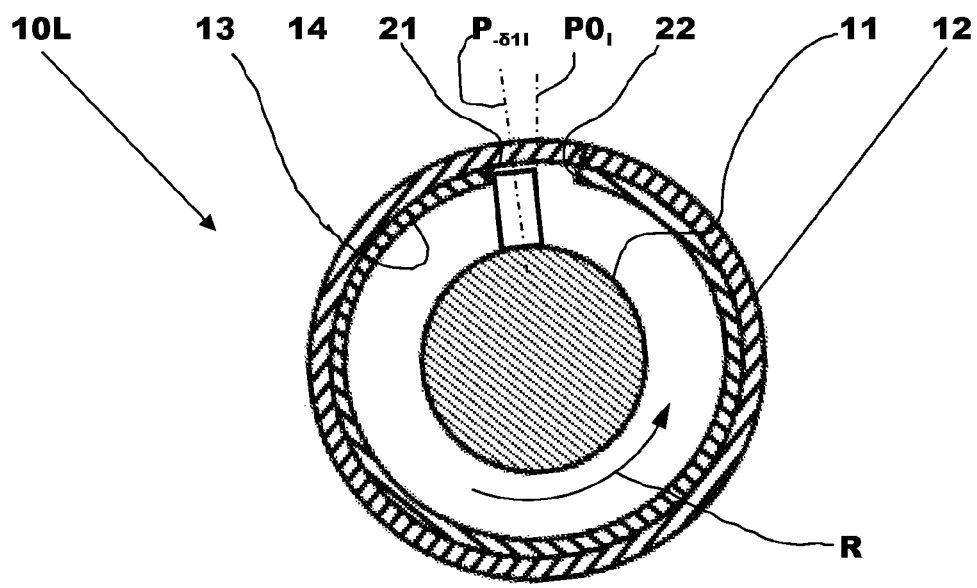
FIG. 4 is an end view in the direction of arrow V on FIGS. 1 and 2 of a driveshaft assembly according to the first aspect of the invention showing the effect of applying a negative or reverse driving torque to the driveshaft assembly shown in FIG. 2 when arranged in accordance with the first embodiment of the first aspect of the invention.

FIG. 4, as viewed by the cross-section represented by line A-A in FIG.2, shows the situation if a negative driving torque "R" is applied to the halfshaft 10L (operated in a reverse mode of operation) as is the case when the motor vehicle 1 is being driven in a reverse direction or is decelerating. In this case, because the drive member 14 is resting against the first end stop 21 in the zero torque position $P0_I$, the effect is to immediately engage both of the driveshafts 11, 12 so that the torsional stiffness $K_C$ of the halfshaft 10L is equal to the combined stiffness of the inner driveshaft 11 and the outer driveshaft 12.

That is to say, for all negative applied torques, the torsional stiffness Kc of the halfshaft 10L=K1+K2, where:
K1 is the torsional stiffness of the inner driveshaft 11; and
K2 is the torsional stiffness of the outer driveshaft 12.
In the case of the example shown in FIG. 4, the inner drive shaft 11 has been angularly displaced to the position $P_{-\delta 1I}$ by the application of a negative torque "R" of magnitude $-\delta 1$. Note that the outer shaft 12 will also have been angularly displaced the same amount because the two driveshafts 11 and 12 are drivingly connected.

It will be appreciated that if the zero torque position were to be set such the drive member 14 is spaced away from the first end stop 21 when no driving torque is being applied then there will also be two modes of operation in the reverse direction. A first mode when the drive member 14 remains away from the first end stop 21 and a second mode after contact has been made between the drive member 14 and the first end stop.

Although as described above it is the second end of the driveshaft assembly or halfshaft that is always connected to the final drive 3f, it will be appreciated that the first end of the driveshaft assembly or halfshaft could be connected to the final drive 3f and the second end could be connected to the respective driven road wheel.

FIGS. 10a to 14d show in a schematic form the rotary or angular deflections of the inner and outer driveshafts 11 and 12 at the first and second ends of the driveshaft assembly when various driving torques are applied to the driveshaft assembly.

FIGS. 10a to 10c show the location of zero torque reference points $P_{Ref}$ for the inner and outer driveshafts 11 and 12 at the first end of the driveshaft assembly and the corresponding zero torque reference points $P0_I$ and $P0_o$ at the second ends of the inner and outer driveshafts 11 and 12 respectively when zero torque is being applied to the driveshaft assembly. The points $P_{\delta 0I}$ and $P_{\delta 0o}$ representing the angular displaced positions for an applied zero torque of $+\delta 0$ in this case are coincident with the corresponding zero reference points $P0_I$ and $P0_o$ because no angular deflection has occurred.

Figure 11D:
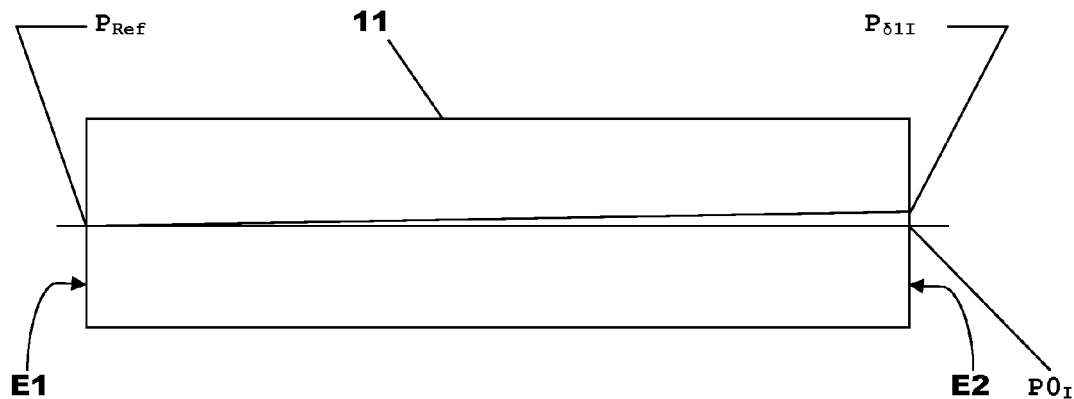
FIG. 11D is a schematic plan view of the inner drive shaft corresponding to FIG. 11b showing the wind-up of the inner driveshaft causing the reference point to be displaced from $P0_I$ to $P_{\delta 1I}$.

FIGS. 11a to 11c show the location of zero torque reference points $P_{Ref}$ for the inner and outer driveshafts 11 and 12 at the first end of the driveshaft assembly and the corresponding zero torque reference points $P0_I$ and $P0_o$ at the second ends of the inner and outer driveshafts 11 and 12 respectively when a positive torque greater than zero but less than a predefined torque limit $T_{Lim}$ is being applied to the driveshaft assembly. The points $P_{\delta 1I}$ and $P_{\delta 1o}$ representing the angular displaced position for an applied torque of $+\delta 1$. In this case the inner shaft 11 has been angularly deflected as indicated by the movement of the reference point to $P_{\delta 1I}$ but the outer shaft has not been angularly deflected because there is no drive to the outer shaft 12 and, therefore, the outer shaft reference point $P_{\delta 1o}$ remains coincident with the corresponding zero reference point $P0_o$ for the outer shaft 12. FIG. 11d shows in plan view the wind up of the inner shaft 11 corresponding to the position shown in FIG. 11b.

FIGS. 12a to 12c show the location of zero torque reference points $P_{Ref}$ for the inner and outer driveshafts 11 and 12 at the first end of the driveshaft assembly and the corresponding zero torque reference points $P0_I$ and $P0_o$ at the second ends of the inner and outer driveshafts 11 and 12 respectively when a positive torque equal to the predefined torque limit $T_{Lim}$ is being applied to the driveshaft assembly. The points $P_{\delta 2I}$ and $P_{\delta 2o}$ representing the angular displaced positions for an applied torque of $+\delta 2$ equal to the torque limit $T_{Lim}$. In this case the inner shaft 11 has been angularly deflected as indicated by the movement of the reference point to $P_{\delta 2I}$ but the outer shaft 12 has still not been angularly deflected because there is still no actual transfer of positive drive torque to the outer shaft 12 and, therefore, the outer shaft reference point $P_{\delta 2o}$ remains coincident with the corresponding zero reference point $P0_o$ for the outer shaft 12.

FIGS. 13a to 13c show the location of zero torque reference points $P_{Ref}$ for the inner and outer driveshafts 11 and 12 at the first end of the driveshaft assembly and the corresponding zero torque reference points $P0_I$ and $P0_o$ at the second ends of the inner and outer driveshafts 11 and 12 respectively when a positive torque greater than the predefined torque limit $T_{Lim}$ is being applied to the driveshaft assembly. The points $P_{\delta 3I}$ and $P_{\delta 3o}$ representing the angular displaced positions for an applied torque of $+\delta 3$ greater than the torque limit $T_{Lim}$. In this case, both the inner and outer shafts 11 and 12 have been angularly deflected as indicated by the movement of the respective reference points to $P_{\delta 3I}$ and $P_{\delta 3o}$.

Figure 14D:
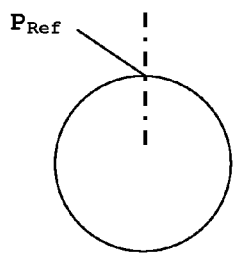
FIG. 14D is a schematic plan view of the inner drive shaft corresponding to FIG. 14B showing the wind-up of the inner driveshaft causing the reference point to be displaced from $P0_I$ to $P_{-\delta 1I}$.
Figure 14D:
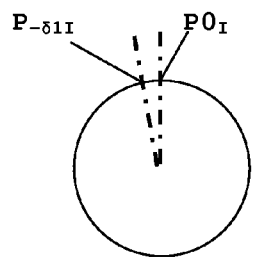
Figure 14D:
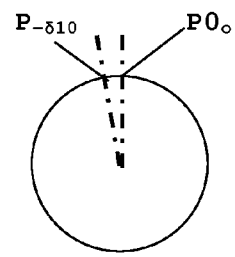
Figure 14D:
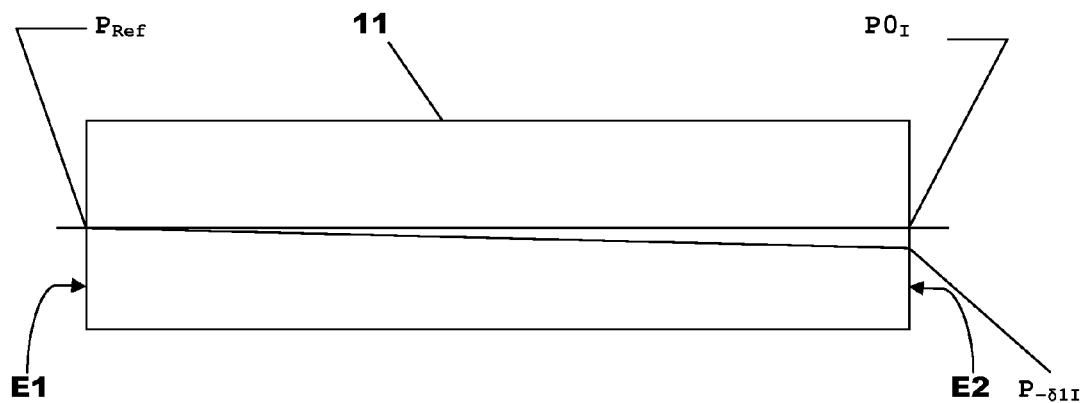

FIGS. 14a to 14c show the location of zero torque reference points $P_{Ref}$ for the inner and outer driveshafts 11 and 12 at the first end of the driveshaft assembly and the corresponding zero torque reference points $P0_I$ and $P0_o$ at the second ends of the inner and outer driveshafts 11 and 12 respectively when a negative torque of $-\delta 1$ is being applied to the driveshaft assembly. The points $P_{-\delta 1I}$ and $P_{-\delta 1o}$ represent the angular displaced positions for the inner and outer shaft respectively due to the negative applied torque of $-\delta 1$. In this case the inner and outer shafts 11 and 12 are both angularly deflected as indicated by the movement of the reference points to $P_{-\delta 1I}$ and $P_{-\delta 1o}$. This is because there is immediate drive to the outer shaft 12 when a negative torque is applied to the driveshaft assembly. FIG. 14d shows in plan view the wind up of the inner shaft 11 corresponding to the position shown in FIG. 14b.

The drivable connection between the inner and outer driveshafts 11 and 12 therefore comprises a mechanical lost motion connection that permits limited angular deflection of, in this case, the inner shaft 11 to occur without transferring torque to the outer driveshaft 12. This enables two modes of operation to be produced, one in which only the inner shaft 11 resists the applied torque and a second when the lost motion is absorbed when both of the driveshafts 11 and 12 resist the applied torque.

With reference to FIGS. 6a to 6e, as viewed by the cross-section represented by line A-A in FIG.2, there is shown a driveshaft assembly 110 that is identical in construction to that previously described and for which like parts have the same reference numeral with the addition of 100 but which is arranged in accordance with a second embodiment of the invention in which a preload is applied to the inner driveshaft 111. As before the inner and outer driveshafts 111 and 112 are arranged coaxially and concentrically and a connection at a first end of the driveshaft assembly 110 prevents relative rotation or relative angular displacement between the inner and outer driveshafts 111 and 112.

In FIGS. 6a to 6e:

P0 is the position of a reference point on the second end of the inner drive shaft when zero torque is applied to the driveshaft assembly;

P1 is the position of the reference point on the second end of the inner drive shaft when a torque equal to a preload torque is applied to the driveshaft assembly;

$P_{\delta T}$ is the position of the reference point on the second end of the inner drive shaft when a torque δT is applied to the driveshaft assembly;

P2 is the position of the reference point on the second end of the inner drive shaft when a torque equal to a predefined torque limit $T_{lim}$ is applied to the driveshaft assembly; and $P_{Torq}$ is the position of the reference point on the second end of the inner drive shaft when a torque greater than the predefined torque limit $T_{lim}$ is applied to the driveshaft assembly.

Figure 7:
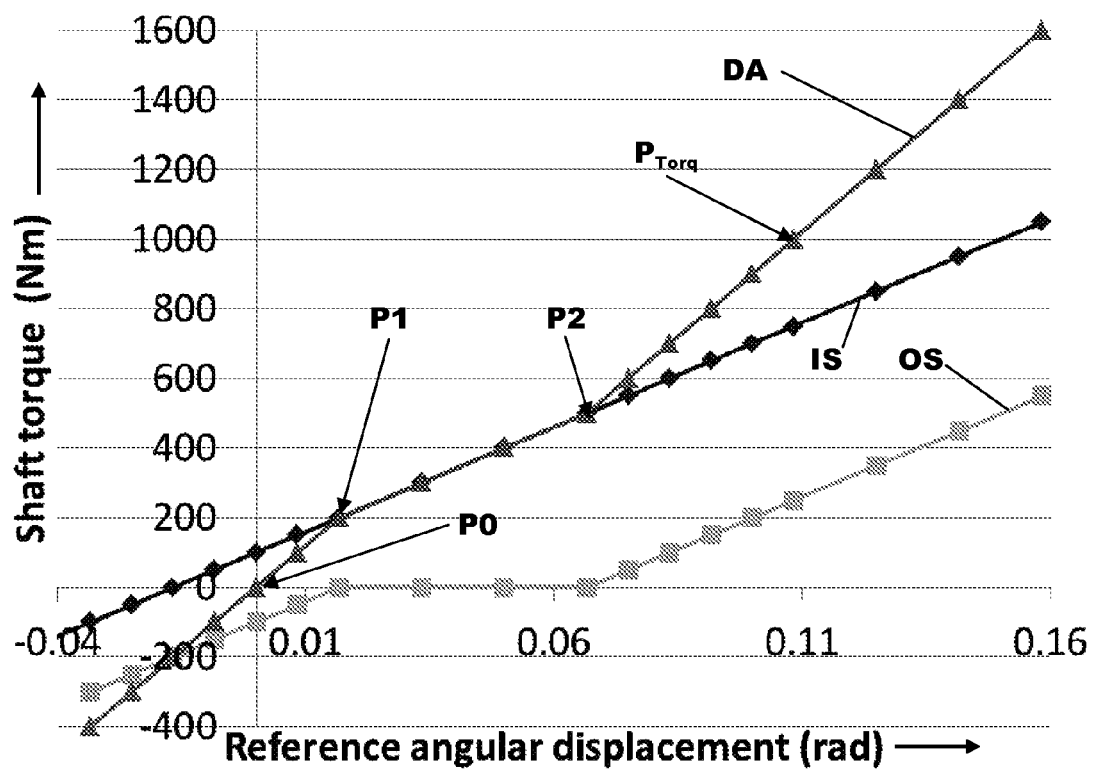
FIG. 7 is a graph showing the relationship between applied torque and angular displacement with respect to a zero applied torque reference position for a driveshaft assembly (DS) constructed in accordance with said second embodiment of the first aspect of the invention and corresponding angular displacements for an inner driveshaft (IS) and an outer driveshaft (OS) that form in combination the driveshaft assembly (DS).

In FIG. 7, the relationship between input torque and angular displacement for the driveshaft assembly DA is shown and corresponding plots IS and OS for the inner and outer driveshafts respectively making up the driveshaft assembly 110 are shown.

The driveshaft assembly 110 is intended to be a direct replacement for the left hand side halfshaft 10L and its operation will firstly be described when a positive or forward driving torque "T" is applied to it.

Assembly of the driveshaft assembly is as follows. The C-shaped ring 113 is located and fastened in the bore of the outer driveshaft 112. The inner drive shaft 111 is then located within the outer driveshaft 112 so that the drive member 114 is positioned between the two end stops 121, 122 with the drive member 114 resting against the first end stop 121.

In the case of this second embodiment, the inner driveshaft 111 is then held fast at the first end of the driveshaft assembly 110 while a predefined torque such as, for example 200 Nm, is applied to the outer driveshaft 112 to cause it to wind up the inner driveshaft 111 by rotating the outer driveshaft 112 in the same direction as the angular displacement that would be produced in the inner driveshaft 111 by the application of a positive driving torque to the driveshaft assembly 110. The inner and outer driveshafts 111 and 112 are then secured together at the first end of the driveshaft assembly 110 by, in this case, welding them together so as to prevent relative rotation therebetween and to drivably connect the two driveshafts 111, 112.

The applied preload torque is then removed from the outer driveshaft 112 and the inner and outer driveshafts 111 and 112 allowing them to unwind slightly until an equilibrium state is achieved. In the case of this example, the inner and outer driveshafts 111 and 112 are of the same individual stiffness and so the equilibrium position is half way between the position when the 200 NM was applied and the position that each drive shaft would be in when no torque is applied to that driveshaft. Therefore, although a 200 Nm preload has been applied to the inner driveshaft 111, the position P0 the inner driveshaft 111 occupies when zero torque is applied to the driveshaft assembly 110 corresponds to displaced position from the zero torque position for the inner driveshaft 111 equal to 100 Nm. This is due to the torque balancing effect between the two driveshafts 111, 112 which produces a torque of 100 Nm in each driveshaft 111, 112 albeit in opposite directions.

The assembly process therefore produces a pre-load torque in the inner and outer driveshafts 111 and 112 which in the case of this example is 200 Nm.

The preload has a number of effects. Firstly, it prevents rattling of the drive member 114 against the first end stop 121 when little or no driving torque is being transmitted and, secondly, it prevents nonlinearity in shaft stiffness characteristic around zero driveshaft torque, allowing for a predictable lash transition.

Figure 6A:
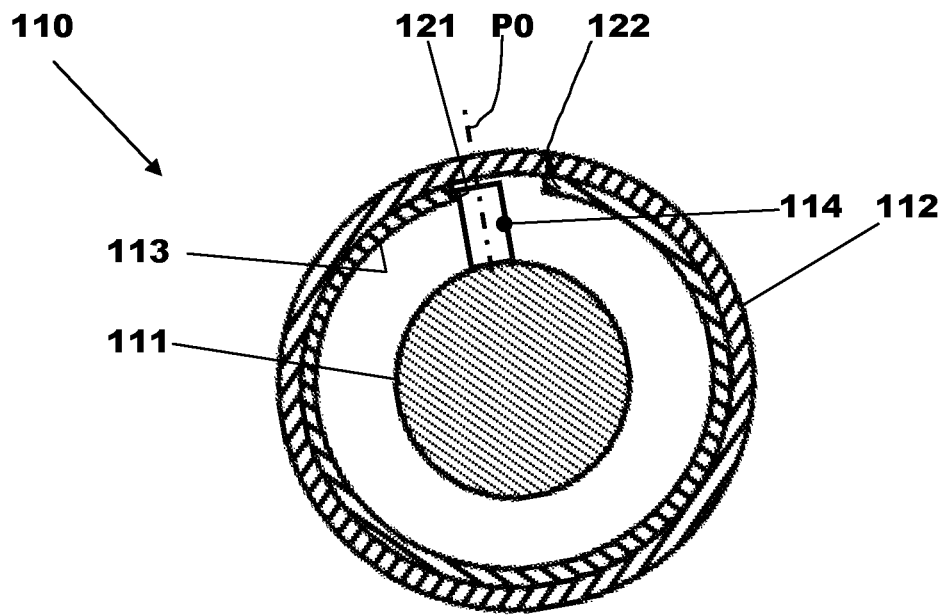
FIGS. 6A, 6B, 6C, 6D, and 6E are end views in the direction of arrow V on FIGS. 1 and 2 for a driveshaft assembly constructed in accordance with the first aspect of the invention showing the effect of applying positive or forward driving torques of differing magnitude to the driveshaft assembly shown in FIG. 2 when arranged in accordance with a second embodiment of the first aspect of the invention.
Figure 6B:
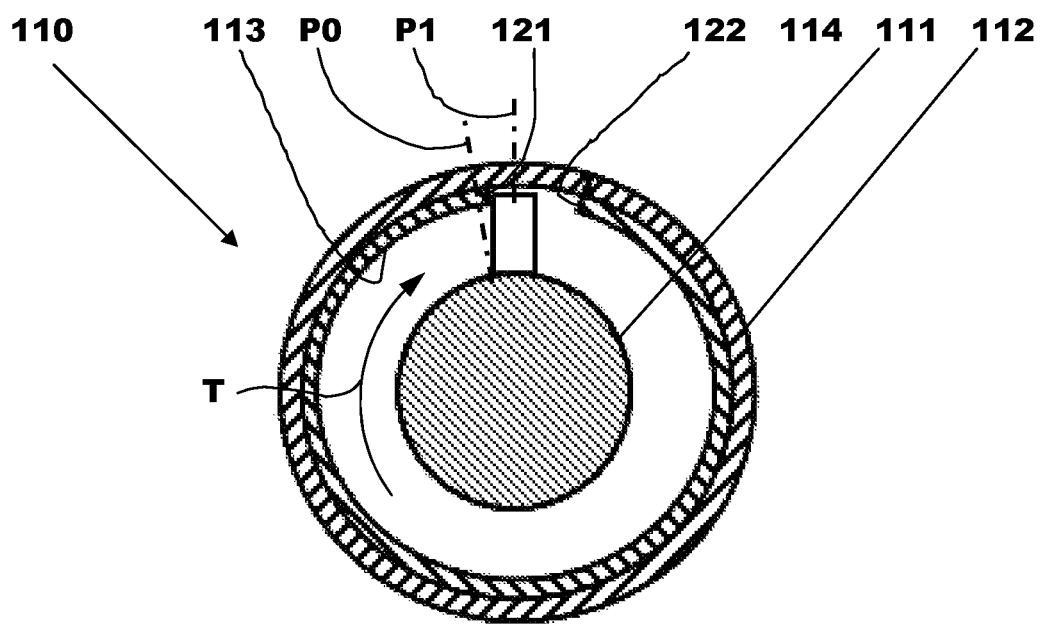

In FIG. 6a, the driveshaft assembly 110 is shown in the zero torque position P0 for the driveshaft assembly 110. In this position both of the driveshafts 111, 112 are displaced from their respective zero torque positions due to the effect of the applied torque preload. The inner driveshaft 111 has been displaced in the same direction as produced by the application of a positive torque to the driveshaft assembly 110 and the outer driveshaft 112 has been displaced in an opposite direction.

Therefore, when a mean positive driving torque "T" is applied to the second end of the driveshaft assembly 110 via the inner driveshaft 111, the torsional stiffness of the driveshaft assembly 110 will not be equal to the stiffness of only the inner driveshaft 111 due to the effect of the preload. In this case, the resistance to twisting of the driveshaft assembly 110 is greater than the torsional stiffness of just the inner driveshaft 111. This is because to rotate the driveshaft assembly 110 from the rotational position P0 to the rotational position P1 where there is no longer a preload on the inner driveshaft 111 requires the application of a positive driving torque of 200 Nm to be applied to the driveshaft assembly 110. However, the amount the inner driveshaft 111 has to be angularly displaced is equal only to the angular displacement expected for 100 Nm due to the effect of the preload as described above and so the torsional stiffness is double that of the inner driveshaft 111. The effect of this is shown in FIG. 7 by the region from the zero torque position P0, where the two axes cross, to the point P1 corresponding to the application of a positive applied torque equal to the torque preload (200 NM in this case) to the driveshaft assembly 110.

In the position P1, the drive member 114 is resting against the first end stop 121 and the torque in the outer driveshaft 112 is equal to zero because the outer driveshaft 112 has unwound from the preload position.

Figure 6C:
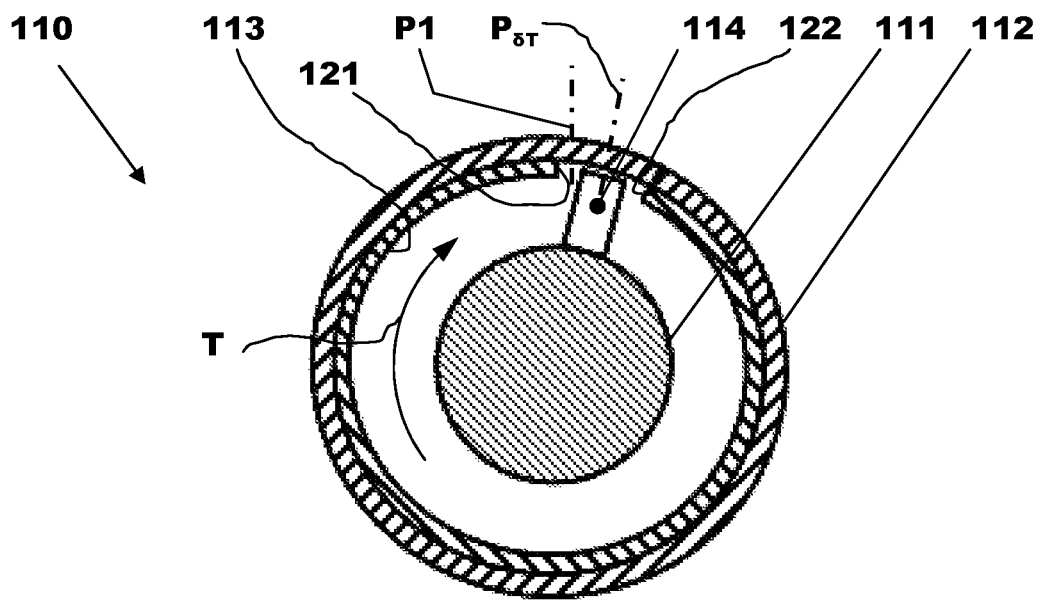

When a mean positive driving torque "δT" greater than 200 NM is applied to the driveshaft assembly 110, the drive member 114 on the inner driveshaft 111 will move away from the first end stop 121 but will not be in contact the second end stop 122 as shown by the position $P_{\delta T}$ on FIG. 6c. The torsional stiffness Kc of the driveshaft assembly 110 will now be equal to the torsional stiffness K1 of only the inner driveshaft 111 and the torque in the outer driveshaft 112 will remain zero.

This situation will continue until the drive member 114 contacts the second end stop 122 which happens when a positive driving torque "T" equal to the predefined torque limit $T_{lim}$ is applied to the driveshaft assembly 110. If the predefined torque limit $T_{lim}$ is set at 500_Nm applied positive driving torque to the driveshaft assembly 110 then between 200 NM and 500 NM the torsional stiffness Kc of the driveshaft assembly 110 will remain equal to the torsional stiffness (K1) of the inner driveshaft 111. This mode of operation is shown as an operating range bounded by the points P1 and P2 on plot DA on FIG. 7.

The application of increasing positive torque "T" in this P1 to P2 operating range will cause the drive member 114 to move away from the first end stop 121 due to increasing wind up of the inner driveshaft 111. However, the angular positions of the first and second end stops 121 and 122 do not alter during this operating range because there is no connection between the inner and outer driveshafts 111 and 112 and so the outer driveshaft is not being angularly displaced.

Figure 6D:
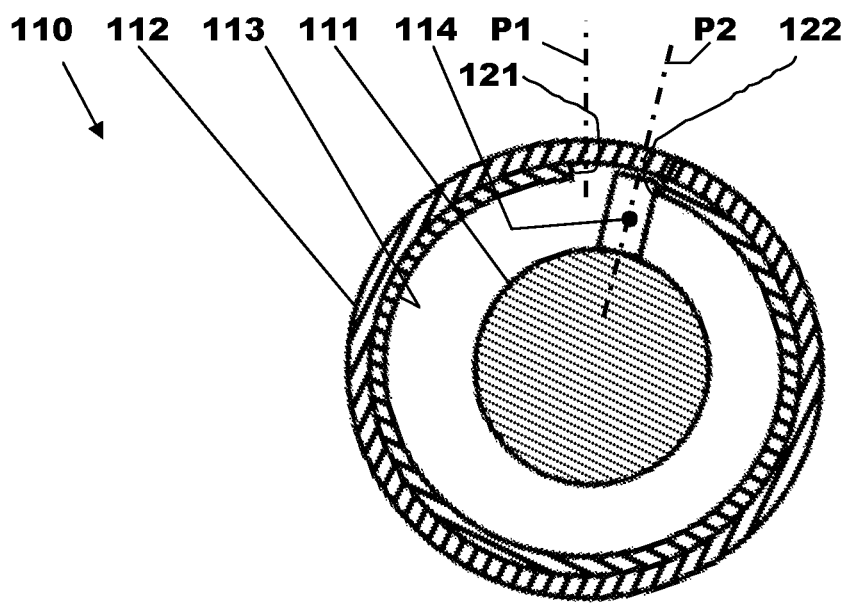

FIG. 6d shows the angular position P2 of the inner driveshaft 111 when the drive member 114 initially contacts the second end stop 122 when the predefined torque limit $T_{lim}$ for the driveshaft assembly 110 has been reached and which corresponds to the point P2 on plot DA on FIG. 7. $T_{lim}$ in this case has been set at 500 Nm.

The contact between the drive member 114 and the second end stop 122 acts so as to drivingly connect the inner and outer driveshafts 111 and 112 together. The torsional stiffness Kc of the driveshaft assembly 110 for all positive torque equal to or greater than this predefined magnitude of torque ($T_{lim}$) will be equal to the stiffness of a combination of the torsional stiffness K1 of the inner driveshaft 111 and the torsional stiffness K2 of the outer driveshaft 112. That is to say, the resistance to twisting of the driveshaft assembly 110 or combined torsional stiffness Kc of the driveshaft assembly 110 will be equal to K1 Nm/rad plus K2 Nm/rad.

Figure 6E:
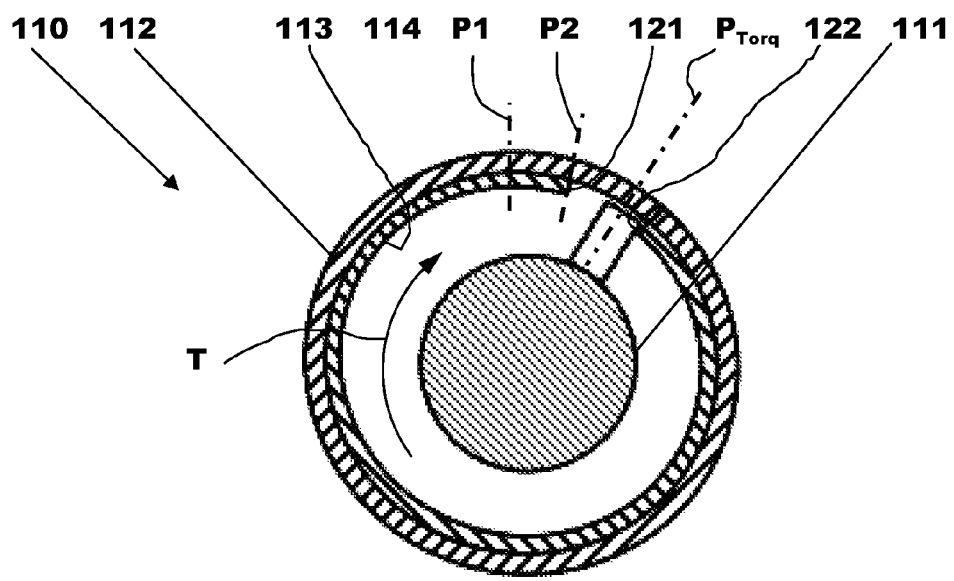

FIG. 6e shows the position $P_{Torq}$ of the inner drive shaft 111 when the driveshaft assembly 110 has a positive driving torque applied to it that is considerably greater than the predefined torque limit $T_{lim}$. In this example the applied positive driving torque is circa 1000 Nm and is indicated on FIG. 7 on plot DA as $P_{Torq}$.

The corresponding rotational positions P1 and P2 for 200 Nm and 500 Nm positive driving torques respectively applied to the driveshaft assembly are also shown on FIG. 6e for comparison purposes.

The operating range for applied positive torques above the predefined torque limit $T_{lim}$ constitutes a second mode of operation in which torsional twisting of both driveshafts 111, 112 occurs because they are now drivingly connected together. The torsional stiffness Kc of the driveshaft assembly 110 in this second mode is equal to the combined stiffness of the inner and outer driveshafts 111 and 112 and is the region to the right of the point P2 on the plot DA on FIG. 7.

As shown in FIG. 6e, the rotational positions of the first and second end stops 121 and 122 are angularly displaced when the applied torque to the driveshaft assembly 110 exceeds the predefined torque limit $T_{lim}$. This is because the second end stop 122 is being moved by the action of the drive member 114 and the distance between the first and second end stops 121 and 122 is fixed.

It will be appreciated that the predefined torque limit $T_{lim}$ is reached when the drive member 114 engages with the second end stop 122 and therefore is related to the preload applied to the inner drive shaft 111, the torsional stiffness of the inner driveshaft 111 and the angular rotation of the inner driveshaft 111 required to move the drive member 114 from the P1 position where it rests against or lightly abuts the first end stop 121 to the P2 position where the opposite surface of the drive member 114 first contacts the second end stop 122.

In the event that a reverse or negative torque is applied to the driveshaft assembly 110 then the torsional stiffness Kc of the driveshaft assembly 110 is always equal to the combined torsional stiffness of the inner driveshaft 111 and the outer driveshaft 112. The effect of this can be seen on FIG. 7 as the part of the line DA to the left of the point P0. Therefore, if the individual torsional stiffness of the inner and outer driveshafts 111 and 112 are both equal to 6000 Nm/rad, the torsional stiffness Kc of the driveshaft assembly 110 when a reverse torque is applied will be equal to 12000 Nm/rad.

As before, the operation of the driveshaft assembly is operable in several differing modes.

In a first mode of operation corresponding to a driveshaft assembly positive applied torque range having a lower limit equal to the preload torque and an upper limit equal to the predefined torque limit $T_{lim}$, drive is transmitted by the driveshaft assembly via only one of the driveshafts 111, 112 and in this case by the inner driveshaft 111 and the resulting driveshaft assembly torsional stiffness is equal to the torsional stiffness of the respective driveshaft 111.

In a second mode of operation corresponding to a driveshaft assembly positive applied torque range having a lower limit equal to the predefined torque limit $T_{lim}$ and an upper limit constrained only by the maximum allowable torque for the driveshaft assembly, drive force is transmitted by both of the driveshafts 111, 112 and the torsional stiffness of the driveshaft assembly is equal to the combined torsional stiffness of both of the driveshafts.

In a third mode of operation corresponding to a driveshaft assembly positive applied torque range between zero and the preload torque magnitude, the torsional stiffness of the driveshaft assembly is a combination of the individual torsional stiffness's of the inner and outer driveshafts 111 and 112.

In a reverse mode of operation when the driveshaft assembly is subjected to a negative drive torque the torsional stiffness Kc of the driveshaft assembly 110 is always equal to a combination of the individual stiffness of each driveshaft.

Therefore, as before, the drivable connection between the inner and outer driveshafts 111 and 112 comprises a mechanical lost motion connection that permits limited angular deflection of, in this case, the inner shaft 111 to occur without transferring torque to the outer driveshaft 112. This enables at least two fundamental modes of operation to be produced one in which only the inner shaft 111 resists the applied torque and a second when the lost motion is absorbed when both of the driveshafts 111 and 112 resist the applied torque. By preloading the driveshaft assembly 110 a third mode of operation is also produced.

Figure 8A:
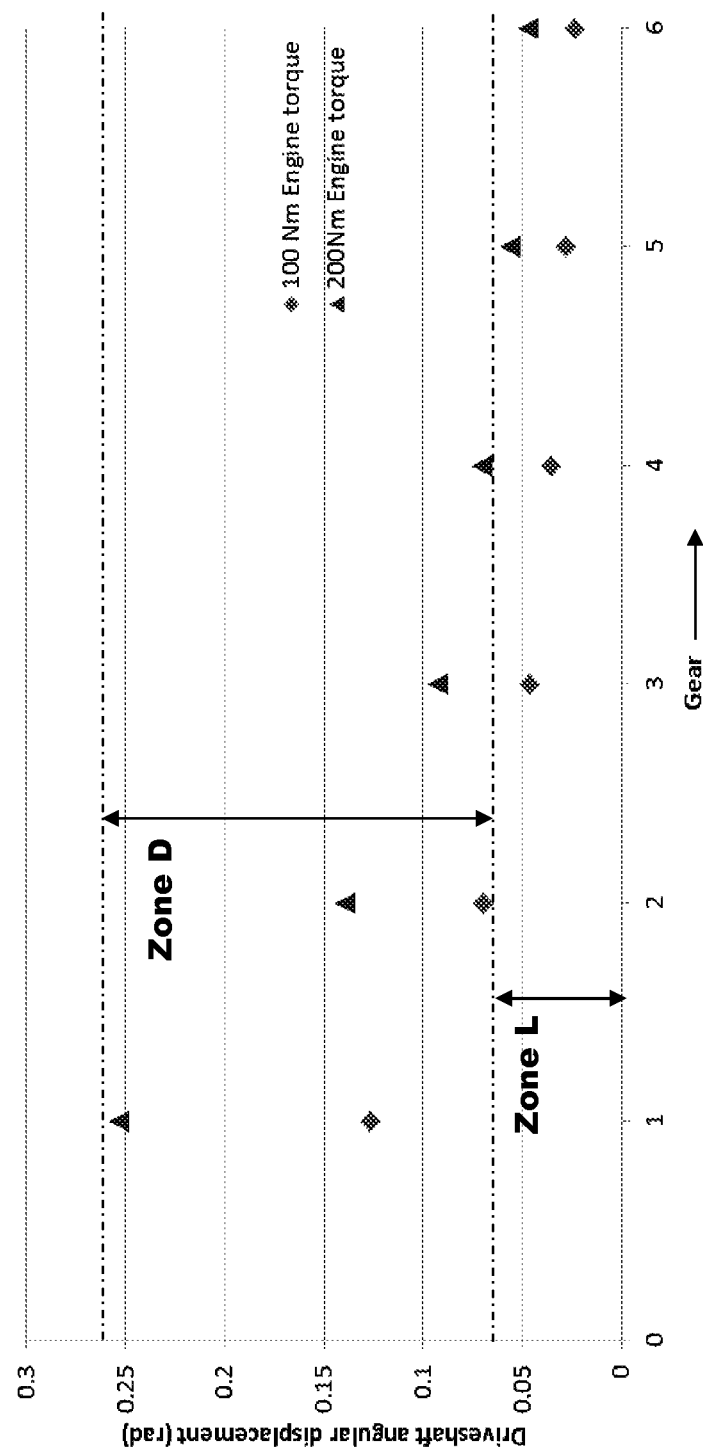
FIG. 8A is a chart for a typical small passenger vehicle showing the relationship between angular displacement of a single 6000 Nm/rad driveshaft relative to a zero torque reference position and engine torque for different gears when two different engine torques are applied to the driveshaft via the transmission.
Figure 9A:
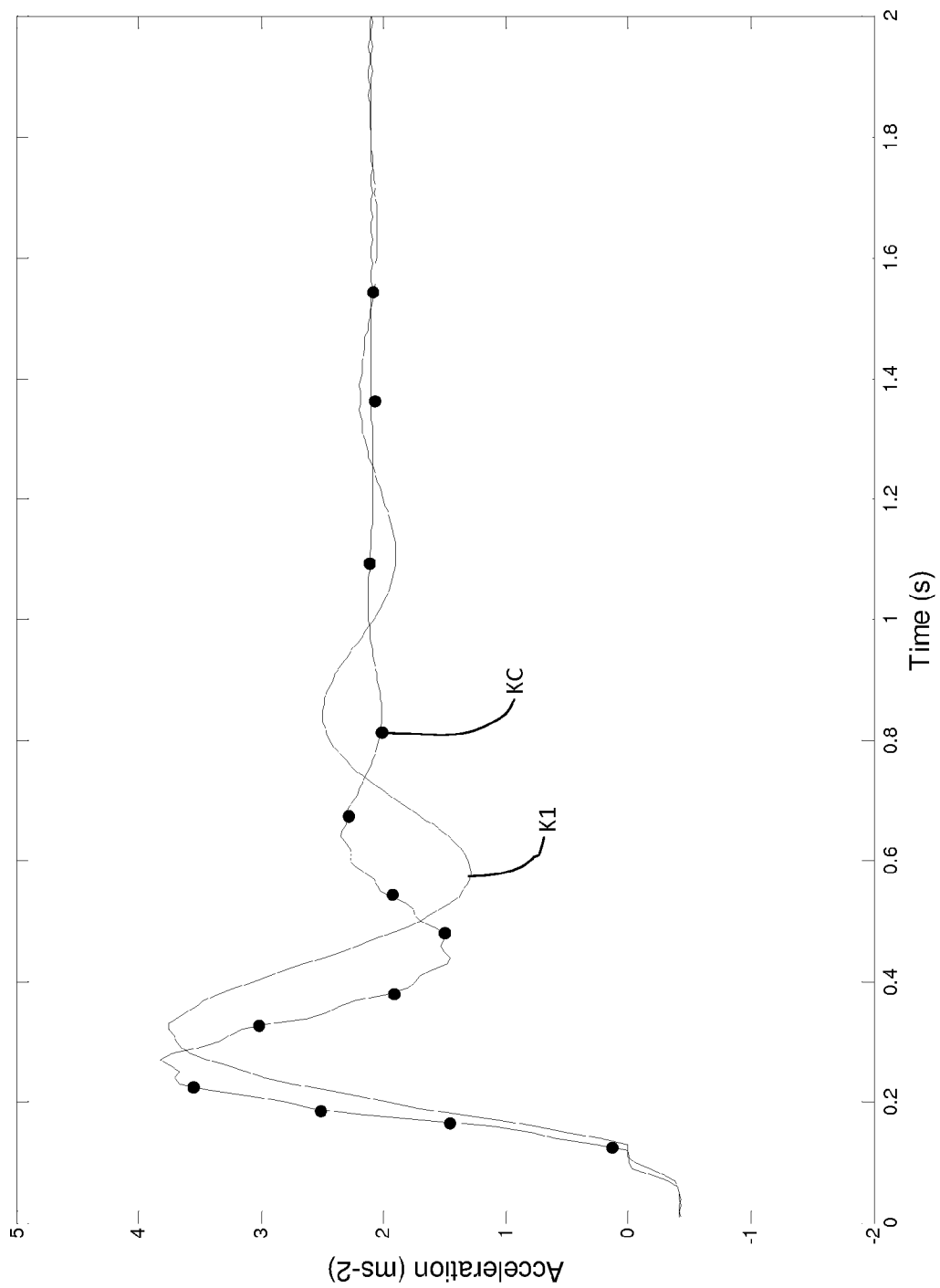
FIG. 9A is a chart showing a comparison of the predicted relationship in first gear between vehicle longitudinal acceleration and time when a 100 Nm step engine torque is applied to a single 6000 Nm/rad driveshaft and a driveshaft assembly constructed in accordance with the second embodiment of the first aspect of the invention.
Figure 9C:
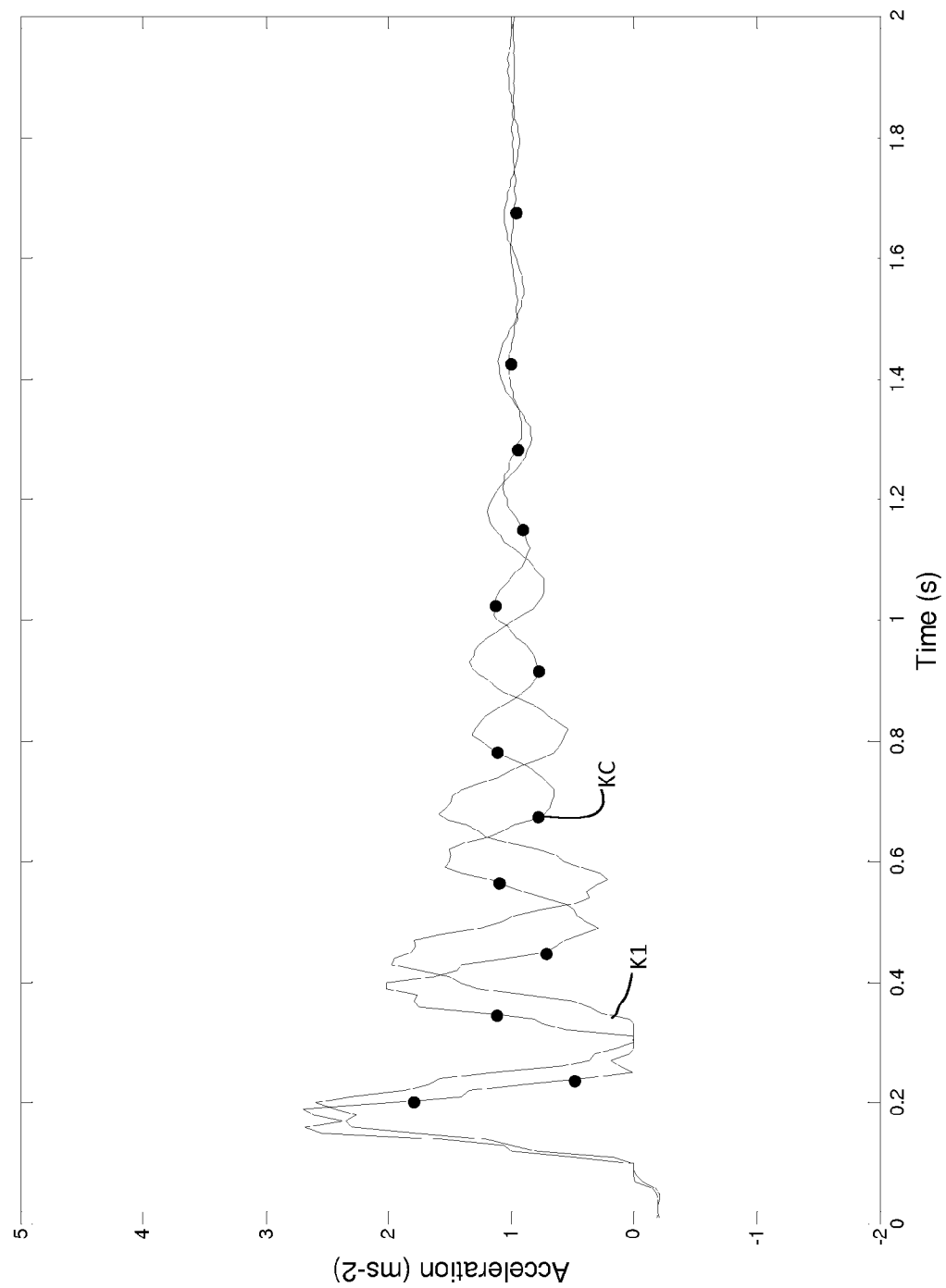
FIG. 9C is a chart showing a comparison of the predicted relationship in third gear between vehicle longitudinal acceleration and time when a 100 Nm step engine torque is applied to a single 6000 Nm/rad driveshaft and a driveshaft assembly constructed in accordance with the second embodiment of the first aspect of the invention.
Figure 9D:
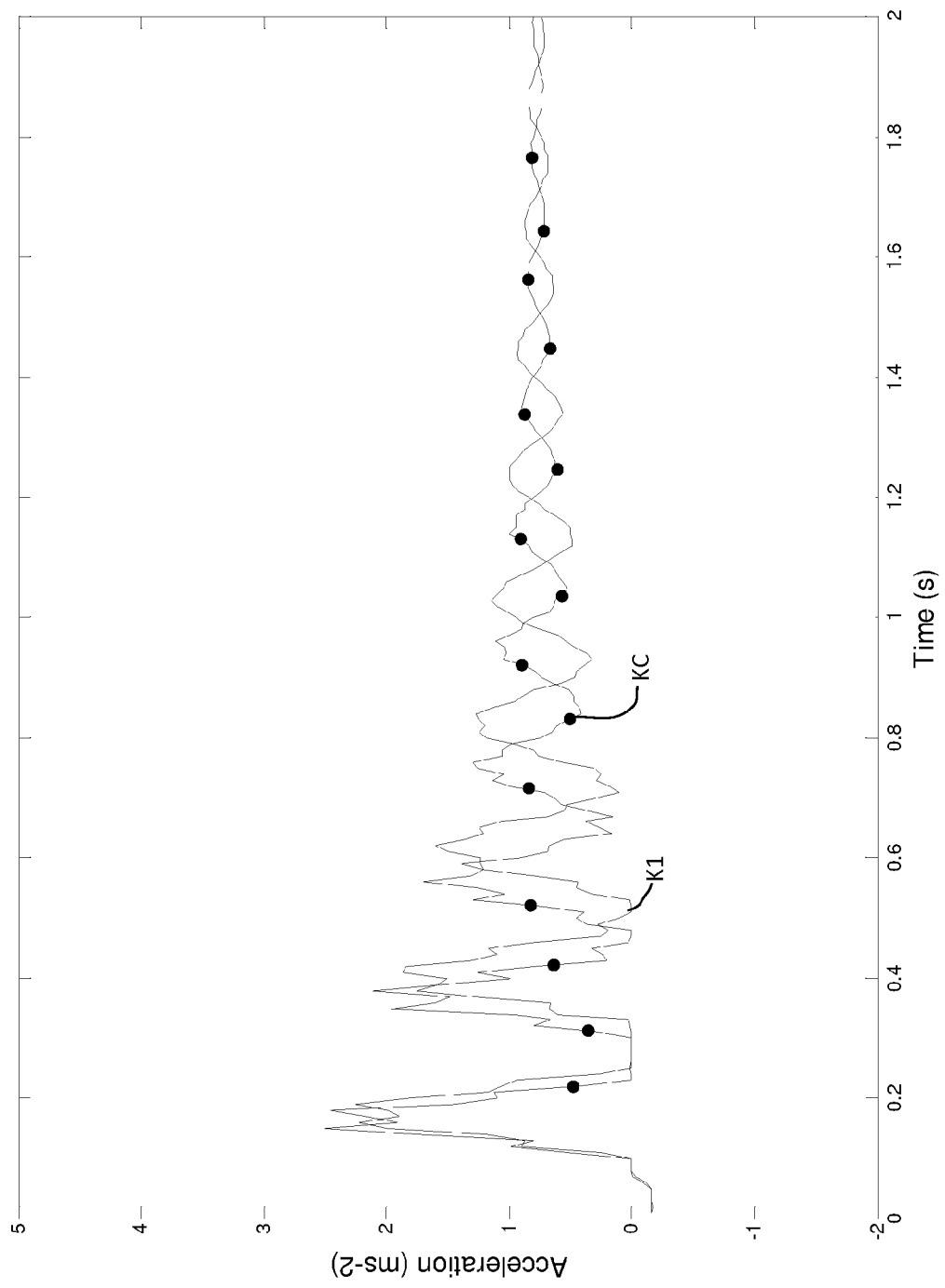
FIG. 9D is a chart showing a comparison of the predicted relationship in fourth gear between vehicle longitudinal acceleration and time when a 100 Nm step engine torque is applied to a single 6000 Nm/rad driveshaft and a driveshaft assembly constructed in accordance with the second embodiment of the first aspect of the invention.

With reference to FIG. 8a there is shown the relationship between angular deflection of a single driveshaft having a torsional stiffness of 6000 Nm/rad when subjected to engine torques of 100 Nm and 200 Nm for various gear ratios. The ratios used to produce these angular deflection values are provided in FIG. 8b.

Two zones 'D' and are identified in FIG. 8a. In zone 'D,' the need is to optimize for drivability and in zone the need is to optimize for lugging.

To optimize for drivability in zone 'D,' the need is to increase the torsional stiffness so as to reduce the angular displacement of the driveshaft and thereby reduce shuffle.

To optimize for lugging in zone the need is to reduce the torsional stiffness so as to increase the angular displacement of the driveshaft so as to improve 'lugging' performance.

The driveshaft assembly 110 is designed such that Zone D is a zone including driveshaft assembly positive driving torques above the predefined torque limit $T_{lim}$ and zone 'L' is a zone including positive driving torques below the predefined torque limit $T_{lim}$.

Therefore, when a driveshaft assembly constructed according to the invention is used to replace the single driveshaft shown in FIG. 8a in which the driveshaft assembly has inner and outer driveshafts each having a torsional stiffness of 6000 Nm/rad and the predefined torque limit $T_{lim}$ is set to 500 Nm, it will be appreciated that the effect will be to reduce the angular displacement for all of the values in zone 'D' irrespective of which embodiment of driveshaft assembly is used and to reduce the angular displacements for all the values in zone 'L'.

Therefore, low stiffness can be provided at high load where lugging occurs and the use of a preload allows for a larger high stiffness region. Because shuffle can occur at low input torques, a high stiffness at low torque is beneficial especially in the lash crossing region (around 0 Nm input torque).

FIGS. 9a to 9d show simulations of the effect of applying a step load of 100 Nm to a single shaft having a torsional stiffness of 6000 Nm/rad and the application of the same torque to a driveshaft assembly constructed in accordance with the second embodiment of the first aspect of the invention for first to fourth gears respectively. The line K1 represents in all cases the response to the step input of the single shaft and the line KC represents in all cases the response to the step input of the driveshaft assembly 110.

FIGS. 9a to 9d were created using a four mass Matlab/Simulink simulation of a typical C-segment vehicle with a single occupant.

In FIGS. 9a to 9d it can be seen that the frequency of oscillation has been increased by using the driveshaft assembly 110 and that the amplitude of oscillation decays more rapidly for the driveshaft assembly 110 indicating that the use of the driveshaft assembly has improved driveline damping.

Therefore, in summary, a driveshaft assembly has been proposed that overcomes the disadvantages associated with the use of a prior art single torsional stiffness arrangement by providing at least two different levels of torsional stiffness that can be optimized to suit the characteristics of the vehicle to which the driveshaft assembly is fitted. The driveshaft assembly is so constructed as to be automatically torque sensing in nature without the need for the measurement of applied torque during use or any other control system architecture.

The torsional stiffness of the driveshaft assembly is dependent primarily upon the torsional stiffness of the individual driveshafts and the number of driveshafts used to transfer torque through the driveshaft assembly and so no additional elastomeric bushes or spring elements, as proposed in GB patent publication 2,070,194 or metal springs are required to produce the different levels of torsional stiffness.

One advantage of the invention is therefore that the driveshaft assembly is simple in construction and hence is economical to manufacture.

A further advantage of the invention is that no external measurement or control equipment is required thereby further reducing vehicle cost and system complexity and potentially increasing durability and reliability.

It will be appreciated that the inner driveshaft could be a solid shaft or a tubular driveshaft.

Although the invention has been described by way of example with reference to a driveshaft assembly having two coaxially arranged driveshafts it will be appreciated that more than two coaxially arranged driveshafts could be used for optimizing the torsional characteristics of a halfshaft. In such a case similar drivable connections could be used between the additional driveshafts as are used between the first and second driveshafts of the described embodiments.

Although in the examples described above a permanent drive is provided via the inner driveshaft and an intermittent drive based upon applied torque is provided via the outer driveshaft it would be possible to use the opposite arrangement.

Furthermore, although the invention is intended primarily for use in the form of a halfshaft for a motor vehicle it will be appreciated that it could be used with beneficial effect for any driveshaft where more than one level of torsional stiffness is desirable.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

What is claimed is:

1. A driveshaft assembly comprising:
first and second coaxially arranged driveshafts connected together at a first end of the assembly to prevent relative rotation therebetween, the second drive shaft including a drive member;
a C-shaped ring fastened to the first driveshaft, the C-shaped ring having a first end stop and a second end stop;
wherein the interaction between the first and second end stops and the drive member forms a drivable connection at a second end of the assembly permitting a limited relative rotation of the driveshafts, providing at least two different torsional stiffness values for the assembly in response to a magnitude of driving torque applied to the assembly at the first end.

2. The driveshaft assembly of claim 1 wherein the torsional stiffness of the driveshaft assembly is dependent upon the torsional stiffness of the individual driveshafts and the number of driveshafts being used to transfer torque through the driveshaft assembly.

3. The driveshaft assembly of claim 1 wherein the drivable connection is operable in a first mode of operation to provide a torsional stiffness for the driveshaft assembly equal to a first value of torsional stiffness when the magnitude of applied torque is below a torque limit, and in a second mode of operation to provide a torsional stiffness for the driveshaft assembly equal to a second value of torsional stiffness wherein the second value of torsional stiffness is greater than the first value of torsional stiffness when the magnitude of applied torque is above the torque limit.

4. The driveshaft assembly of claim 3 wherein the torsional stiffness of the driveshaft assembly is equal to the torsional stiffness of the first driveshaft when in the first mode of operation, and wherein the torsional stiffness of the driveshaft assembly is equal to the sum of the stiffnesses of the first and second driveshafts when in the second mode of operation.

5. The driveshaft assembly of claim 1 wherein a torque preload is applied between the first and second driveshafts by the drivable connection which is operable in three modes of operation based upon the magnitude of driving torque applied to the driveshaft assembly, wherein the first mode of operation occurs when a magnitude of driving torque applied to the driveshaft assembly is below the predetermined torque limit but above the torque preload, the second mode of operation occurs when the magnitude of driving torque applied to the driveshaft assembly is above the predetermined torque limit, and the third mode of operation occurs when the magnitude of driving torque applied to the driveshaft assembly is greater than zero but less than the torque preload.

6. The driveshaft assembly of claim 5 wherein in the first and third modes of operation drive force is transmitted by the driveshaft assembly via only one of the driveshafts, and in the second mode of operation drive force is transmitted by the driveshaft assembly via both of the driveshafts.

7. The driveshaft assembly of claim 1 wherein the drivable connection comprises a mechanical lost motion connection between the two driveshafts, and wherein the mechanical lost motion connection permits limited angular deflection of the first driveshaft to occur due to an applied torque to the driveshaft assembly without causing angular deflection of the second driveshaft.

8. The driveshaft assembly of claim 1 comprising a motor vehicle halfshaft drivably connecting a transmission of the motor vehicle to a road wheel of the motor vehicle.

9. The driveshaft assembly of claim 1 wherein the first and second end stops include elastomeric bump stops.

10. A driveshaft assembly coupling a transmission to a wheel, comprising:

first and second coaxial driveshafts connected at a transmission end of the assembly to prevent relative rotation therebetween, the second drive shaft including a drive member;

a C-shaped ring fastened to the first driveshaft, the C-shaped ring having a first end stop and a second end stop;

wherein the interaction between the first and second end stops and the drive member forms a mechanical lost motion connection between the two driveshafts at a wheel end of the assembly which permits limited angular deflection of the first driveshaft to occur due to an applied torque to the driveshaft assembly without causing angular deflection of the second driveshaft.

11. The driveshaft assembly of claim 10 wherein the first and second end stops include elastomeric bump stops.

* * * * *